United States Patent
Levy

(10) Patent No.: US 7,767,631 B2
(45) Date of Patent: *Aug. 3, 2010

(54) LUBRICANT COMPOSITIONS AND METHODS

(75) Inventor: Richard Levy, Fort Myers, FL (US)

(73) Assignee: Lee County Mosquito Control District, Fort Myers, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/359,809

(22) Filed: Jul. 23, 1999

(65) Prior Publication Data

US 2003/0013615 A1 Jan. 16, 2003

Related U.S. Application Data

(60) Division of application No. 08/487,436, filed on Jun. 7, 1995, now abandoned, and a continuation of application No. 08/943,123, filed on Oct. 3, 1997, now Pat. No. 6,734,147.

(51) Int. Cl.
| | |
|---|---|
| C10M 169/04 | (2006.01) |
| C10M 161/00 | (2006.01) |
| C10M 125/00 | (2006.01) |
| C10M 125/04 | (2006.01) |
| C10M 141/06 | (2006.01) |

(52) U.S. Cl. ............ 508/116; 508/122; 508/123; 508/149; 508/150; 508/151; 508/156; 508/161; 508/165; 508/166; 508/168; 508/169; 508/171; 508/172; 508/464; 508/487; 508/488; 508/516; 508/167; 508/173

(58) Field of Classification Search ............... 508/116, 508/122, 123–131, 149–151, 156, 158, 161, 508/165–169, 171–172, 173, 459, 464, 487, 508/488, 516, 103, 105–109, 113, 148, 155–157, 508/159, 162, 176–177, 179, 362, 451, 469, 508/473, 474, 491, 507, 590–591; 427/209

See application file for complete search history.

(56) References Cited

U.S. PATENT DOCUMENTS

| | | | | |
|---|---|---|---|---|
| 3,224,966 | A | 12/1965 | Li | 508/106 |
| 3,336,225 | A * | 8/1967 | Sayad | |
| 3,873,458 | A | 3/1975 | Parkinson | |
| 3,939,081 | A | 2/1976 | DeHart et al. | 508/150 |
| 3,983,042 | A | 9/1976 | Jain et al. | 508/121 |
| 3,994,697 | A | 11/1976 | Burke | 508/150 |
| 4,050,932 | A | 9/1977 | Lemmer | 508/123 |
| 4,056,103 | A | 11/1977 | Kaczmarzyk et al. | 128/285 |
| 4,076,637 | A | 2/1978 | Hurst | 508/150 |
| 5,158,694 | A | 2/1978 | Hurst | 508/150 |
| 4,096,076 | A | 6/1978 | Spiegelberg | 508/129 |
| 4,104,178 | A | 8/1978 | Jain et al. | 508/121 |
| 4,127,491 | A | 11/1978 | Reick | 252/22 |
| 4,143,423 | A | 3/1979 | Sternlieb | 508/180 |
| 4,287,073 | A | 9/1981 | Jain et al. | 508/129 |
| 4,340,706 | A * | 7/1982 | Obayashi et al. | 526/207 |
| 4,363,737 | A | 12/1982 | Rodriguez | 508/124 |
| 4,376,710 | A | 3/1983 | Gardos et al. | 508/123 |
| RE31,611 | E | 6/1984 | Wainwright | 508/180 |
| 4,474,669 | A | 10/1984 | Lewis et al. | 252/25 |
| 4,479,981 | A | 10/1984 | Winters et al. | 427/27 |
| 4,486,319 | A * | 12/1984 | Jamison | |
| 4,525,527 | A | 6/1985 | Takeda et al. | 524/831 |
| 4,541,984 | A | 9/1985 | Palmer | 508/150 |
| 4,552,938 | A | 11/1985 | Mikita et al. | 526/240 |
| 4,557,839 | A | 12/1985 | Tubbs et al. | 508/129 |
| 4,575,430 | A | 3/1986 | Periard et al. | 508/129 |

(Continued)

FOREIGN PATENT DOCUMENTS

EP    0 043 182    1/1982

(Continued)

OTHER PUBLICATIONS

Pp. 167-168. Shreve, *The Chemical Process Industries*, 2nd Edition, N.Y., 1956.*

(Continued)

*Primary Examiner*—Cephia D Toomer
(74) *Attorney, Agent, or Firm*—The Law Offices of Robert J. Eichelburg

(57) ABSTRACT

A process is disclosed for manufacturing a lubricant composition comprising combining a superabsorbent polymer with a material for decreasing friction between moving surfaces. The superabsorbent polymer absorbs from about 25 to greater than 100 times its weight in water and may comprise a polymer of acrylic acid, an acrylic ester, acrylonitrile or acrylamide, including co-polymers thereof or starch graft co-polymers thereof or mixtures thereof. A product produced by the process includes the material for decreasing friction comprising a petroleum lubricant containing an additive, water containing an additive, synthetic lubricant, grease, solid lubricant or metal working lubricant, wherein the synthetic lubricant, grease, solid lubricant or metal working lubricant optionally contain an additive. A process comprising controlling the delivery of a lubricant to at least one of two moving surfaces in order to decrease friction between said moving surfaces, is also disclosed. This process includes applying the lubricant composition to at least one of the surfaces. The lubricant composition in this instance comprises a superabsorbent polymer combined with a material for decreasing friction between moving surfaces, wherein the material for decreasing friction comprises a petroleum lubricant, water, synthetic lubricant, grease, solid lubricant or metal working lubricant, and optionally an additive.

28 Claims, No Drawings

U.S. PATENT DOCUMENTS

| | | | | |
|---|---|---|---|---|
| 4,612,250 | A | | 9/1986 | Takeda et al. ............... 524/555 |
| 4,618,631 | A | | 10/1986 | Takeda et al. ............... 521/109 |
| 4,647,386 | A | | 3/1987 | Jamison ...................... 508/150 |
| 4,654,393 | A | | 3/1987 | Mikita et al. ................. 526/240 |
| 4,677,174 | A | | 6/1987 | Alexander et al. .......... 526/240 |
| 4,703,067 | A | | 10/1987 | Mikita et al. ................. 521/63 |
| 4,703,997 | A | | 11/1987 | Ijiri et al. .................... 385/109 |
| 4,711,523 | A | | 12/1987 | Iri et al. ...................... 385/109 |
| 4,740,528 | A | | 4/1988 | Garvey et al. ............... 521/128 |
| 4,756,841 | A | | 7/1988 | Buran et al. ................. 508/150 |
| 4,761,241 | A | * | 8/1988 | Kobori et al. |
| 4,765,917 | A | | 8/1988 | Otaki et al. .................. 508/121 |
| 4,787,991 | A | | 11/1988 | Morozumi et al. ............ 252/25 |
| 4,908,142 | A | | 3/1990 | Dumdum et al. ............. 508/129 |
| 4,909,951 | A | | 3/1990 | Mendelson et al. ......... 508/129 |
| 4,965,001 | A | | 10/1990 | King ........................... 508/129 |
| 4,977,192 | A | * | 12/1990 | Martineu et al. ............. 521/56 |
| 4,983,389 | A | | 1/1991 | Levy |
| 4,985,251 | A | | 1/1991 | Levy |
| 4,986,923 | A | | 1/1991 | Waynick ..................... 508/180 |
| 5,013,464 | A | | 5/1991 | Sugimura et al. ........... 508/150 |
| 5,049,235 | A | | 9/1991 | Barcus et al. .................. 162/9 |
| 5,049,289 | A | | 9/1991 | Jacobs ......................... 508/129 |
| 5,049,593 | A | | 9/1991 | Marciano-Agostinelli et al. ........................... 523/173 |
| 5,093,015 | A | | 3/1992 | Oldiges ....................... 508/124 |
| 5,114,886 | A | | 5/1992 | Tsukada ........................ 501/88 |
| 5,156,756 | A | | 10/1992 | Kojima ........................ 508/178 |
| 5,160,789 | A | | 11/1992 | Barcus et al. ................ 428/361 |
| 5,173,204 | A | | 12/1992 | Chiddick et al. ............ 508/180 |
| 5,218,011 | A | | 6/1993 | Freeman ..................... 523/173 |
| 5,237,945 | A | | 8/1993 | White .......................... 112/420 |
| 5,244,587 | A | | 9/1993 | Ito et al. ...................... 508/180 |
| 5,256,705 | A | | 10/1993 | Freeman ..................... 523/173 |
| 5,264,251 | A | | 11/1993 | Geursen et al. ............. 427/389 |
| 5,268,229 | A | | 12/1993 | Phillips et al. .............. 428/400 |
| 5,269,953 | A | | 12/1993 | Whewell ..................... 508/129 |
| 5,275,760 | A | * | 1/1994 | Johnson ................. 252/389.61 |
| 5,298,179 | A | | 3/1994 | Ukita et al. .................... 44/626 |
| 5,306,867 | A | | 4/1994 | Connole et al. ........... 174/23 R |
| 5,308,514 | A | | 5/1994 | Olson et al. ................. 508/180 |
| 5,342,686 | A | | 8/1994 | Guersen et al. ............. 428/378 |
| RE34,732 | E | | 9/1994 | Iri et al. ...................... 385/109 |
| 5,346,634 | A | | 9/1994 | Sawazaki et al. ............ 508/129 |
| 5,362,766 | A | * | 11/1994 | Hopkins, Jr. et al. ........ 523/105 |
| 5,363,821 | A | | 11/1994 | Rao et al. .................... 508/129 |
| 5,389,166 | A | | 2/1995 | White .......................... 156/79 |
| 5,397,485 | A | | 3/1995 | Weichsel et al. ............ 508/150 |
| 5,437,802 | A | | 8/1995 | Kurashi et al. .............. 508/129 |
| 5,442,005 | A | * | 8/1995 | Brugarolas et al. .......... 524/558 |
| 5,443,899 | A | | 8/1995 | Barcus et al. ................ 428/288 |
| 5,456,848 | A | | 10/1995 | Nader et al. ................. 508/180 |
| 5,461,195 | A | | 10/1995 | Freeman et al. ........... 174/23 R |
| 5,534,304 | A | * | 7/1996 | Geursen et al. .......... 427/389.9 |
| 5,592,949 | A | | 1/1997 | Moench et al. .............. 128/837 |
| 5,611,981 | A | | 3/1997 | Phillips et al. .............. 264/130 |
| 5,617,877 | A | | 4/1997 | Moench et al. .............. 128/837 |
| 5,626,154 | A | | 5/1997 | Rogers et al. ............... 132/200 |
| 5,662,633 | A | | 9/1997 | Doak et al. .................. 604/378 |
| 5,672,640 | A | | 9/1997 | Brauer ........................ 523/173 |
| 5,675,277 | A | | 9/1997 | Parket et al. ................. 210/689 |
| 5,698,074 | A | | 12/1997 | Barcus et al. .................. 162/9 |
| 5,723,159 | A | | 3/1998 | Phillips et al. .............. 425/461 |
| 5,728,742 | A | | 3/1998 | Staples et al. ................. 521/57 |
| 5,733,490 | A | | 3/1998 | Phillips et al. .............. 264/130 |
| 5,792,717 | A | * | 8/1998 | Takayama ..................... 501/88 |
| 6,319,558 | B1 | | 11/2001 | Willemsen ............... 427/389.8 |
| 2002/0198113 | A1 | | 12/2002 | Levy ........................... 508/100 |
| 2003/0013615 | A1 | | 1/2003 | Levy ........................... 508/113 |

FOREIGN PATENT DOCUMENTS

| | | | |
|---|---|---|---|
| EP | 0 242 040 | | 10/1987 |
| EP | 0 360 383 | A2 | 9/1988 |
| EP | 0 317 684 | | 5/1989 |
| EP | 0 360 383 | A2 | 3/1990 |
| EP | 0 606 700 | A1 | 7/1993 |
| EP | 0 536 308 | B1 | 2/1994 |
| EP | 0 507 875 | B1 | 6/1995 |
| EP | 732374 | A2 | 9/1996 |
| EP | 0 596 038 | B1 | 3/1997 |
| EP | 0 779 389 | A2 | 6/1997 |
| EP | 0 784 116 | A2 | 7/1997 |
| EP | 0 482 703 | B1 | 9/1997 |
| EP | 0 630 434 | B1 | 9/1997 |
| EP | 0 779 389 | A3 | 3/1998 |
| EP | 0 784 116 | A3 | 4/1998 |
| EP | 0 651 829 | B1 | 5/1998 |
| EP | 0 491 453 | B1 | 7/1998 |
| GB | 2 207 146 | | 1/1989 |
| GB | 2207146 | A * | 1/1989 |
| JP | 6-184588 | | 9/1980 |
| JP | 55-115474 | | 9/1980 |
| JP | 57-12098 | | 1/1982 |
| JP | 61-183205 | | 8/1986 |
| JP | 61-183394 | | 8/1986 |
| JP | 62-184096 | | 8/1987 |
| JP | 1-156398 | | 6/1989 |
| JP | 1-282295 | | 11/1989 |
| JP | 4-11697 | | 1/1992 |
| JP | 5-118190 | | 5/1993 |
| WO | WO 89/12449 | | 12/1989 |
| WO | 91/09916 | | 7/1991 |
| WO | WO93/18223 | * | 9/1993 |
| WO | WO 97/03117 | | 1/1997 |

OTHER PUBLICATIONS

Booser, Ph.D., *CRC Handbook of Lubrication* (Theory and Practice, of Tribology) vol. II Theory & Design, pp. 46-56, 269, 301-315, and 333 and 525-530, 1984.*

*The Merck Index*, Windholz, N.J. p. 6447, (#4347), 1983.*

Schey, *Tribology In Metal Working*, Friction, Lubrication and Wear, pp. 131-179, 431-436, 465-470, 487-503, 1983.*

*Super absorbent Polymers*, Science and Technology, ACS Symposium Series S73, Buchholz et al., pp. 27-38 and 88-141, 1994.*

*Absorbent Polymer Technology*, Studies in Polymer Science 8, Lisa Brannon-Peppas et al. editor, Elsevier Science Publishing Bmp, any Inc., N.Y. pp. 3-55, 126-129, 142-143, 202-205, 223-247, & 245, 1990.*

Derwent Abstract J04011697, dated Jan. 16, 1992, p. 01/01.

PCT Search Report dated Oct. 3, 1996, PCT/US96/10246.

Garner et al. *Journal of Chemical Education*, Jan. 1997, vol. 74 No. 1, p. 95.

* cited by examiner

LUBRICANT COMPOSITIONS AND METHODS

RELATED APPLICATIONS

This is a division of parent application Ser. No. 08/487,436, filed Jun. 7, 1995 now abandoned and Continuation application Ser. No. 08/943,123, filed Oct. 3, 1997 now U.S. Pat. No. 6,734,147 all of which are incorporated herein by reference.

FIELD OF THE INVENTION

The field of the invention is lubricants and especially lubricant compositions comprising a superabsorbent polymer in combination with a lubricant material.

DESCRIPTION OF RELATED ART

Lubricant materials function by separating moving surfaces to minimize friction and wear. Archeological evidence dating to before 1400 B.C. shows the use of tallow to lubricate chariot wheel axles. Leonardo da Vinci discovered the fundamental principles of lubrication and friction, but lubrication did not develop into a refined science until the late 1880's in Britain when Tower produced his-studies on railroad car journal bearings in 1885. In 1886 Reynolds developed this into a theoretical basis for fluid film lubrication.

Lubrication principles vary from the separation of moving surfaces by a fluid lubricant through boundary lubrication, to dry sliding. In many respects, these principals are coextensive.

Fluid Film Lubrication

In fluid film lubrication, the load on moving surfaces is supported entirely by the fluid between the surfaces which is a film under pressure. The pressure on the film develops through the motion of the surfaces, which in turn delivers the lubricant into a converging wedge-shaped zone. The behavior of the moving surfaces is totally dependent on the fluidity or viscous behavior of the lubricant. Film pressure and power loss are dependent on the viscosity of the lubricant as well as the configuration of the moving surfaces, and lubricant shear strength. Hydrodynamic or squeeze-film action cannot provide adequate load support in some instances for bearings lubricated with oil or water. Pumping the lubricant into the moving surfaces sometimes provides the necessary hydrodynamic or squeeze-film properties for bearings used for handling heavy loads in low speed equipment. This practice is especially common with low viscosity lubricants such as water. It would therefore be advantageous to provide additives to these types of lubricants to overcome these difficulties.

Oil film lubricants on surfaces are limited in their lubricating capabilities and as such have load limits. Asperities or high spots on the moving surfaces will in turn support the load when the load limit of the lubricant is reached so that the lubrication moves from full-film to mixed-film to complete boundary lubrication with an increase in coefficient of friction between the moving surfaces. High load, low speed, low viscosity lubricants, misalignment, high surface roughness or an inadequate supply of lubricant causes this change from full-film to boundary lubrication. Chemical additives, however, can reduce resultant wear and friction.

Surface contact through asperities on the moving surfaces can result in tearing of the surfaces and is especially a problem with increasing loads. Plastic deformation, temperature buildup and welding of the surfaces with eventual seizure of the surfaces occurs as a result. This problem is especially prevalent in hypoid gears used in automobile differentials. Extreme pressure lubricants combat welding of the surfaces in these circumstances and contain organic compounds that react at these elevated temperatures and form high-melting inorganic lubricant films on the surfaces. Sulfur, chlorine, phosphorous and lead compounds in these additives provide low shear strength layers that minimize surface tearing, or coat the moving surfaces to prevent fusing. Since extreme pressure additives function by chemical action, they are not used where the metal surfaces will be severely eroded. Increasing the lubricant or oil viscosity by means of an additive, lowering the unit bearing loading, improving the finish on the moving surfaces and use of external pressurization offer alternatives to extreme-pressure additives.

Dry rubbing or dry sliding involving solid-to-solid contact occurs in fluid lubrication systems as for example machine start-up, run-in misalignment or inadequate clearance, reversal of direction of moving surfaces, or any unforeseen or unplanned interruptions in lubricant delivery. Conventional lubricants such as greases or oils also are not used on moving surfaces in extreme temperature, high vacuum, radiation or contamination environments. Dry lubricants applied as thin coatings or as particulate materials in these environments reduce wear and friction of moving surfaces. These films or particulate materials may comprise or incorporate solid or particulate carbon-graphite, lead babbitt, bronze, aluminum, polyethylene or polytetrafluoroethylene solid or particulate materials in a binder where the film or particulates are adhered to one or both of the moving surfaces. The effectiveness of the dry lubricant film or particulates is controlled to some degree by the binder where solid or particulate lubricants are employed as well as conditions of use such as the load, surface temperatures generated during use, speed of the moving surfaces, hardening, fatigue, welding, recrystallization, oxidation and hydrolysis. It would be an advantage therefore to have a binder that is strongly adherent and resistant to some of the conditions generated while in use.

In elastohydrodynamic lubrication carrying the load on rolling contacts in ball and roller bearings, gear teeth, cams or friction drives, minimizes lubrication problems. Focusing the load on a small contact area on these moving surfaces results in high elastic contact stresses. Lubricant films help support the load which is described as "elastohydrodynamic," because of the close relationship between the formation of a thin hydrodynamic fluid lubricant film and elastic deformation.

The lubricant viscosity and film conditions at the entry of the contact zone in these systems generally fix the lubricant film thickness which is substantially uniform over most of its length along the contact. It is believed that high contact pressures lead to excessive lubricant viscosity and pressure distribution close to the Hertz pattern for simple static elastic contact theory. It has also been noted that only a slight reduction in film thickness results with increasing loads with pronounced contact deformation. In plotting contact pressure in psi (pounds per square inch) against distance and direction of lubricant flow, it appears that optimum lubricity is obtained with a sharp pressure spike at the exit portion of the lubricant film; however, this does not take into account changes in temperature, relaxation time or other variables in the lubricating system. It would therefore be an advantage to provide an additive that would enhance viscosity and film formation and retention under these and other conditions.

Load capacity with a full elastohydrodynamic film is limited by fatigue strength of the moving surfaces in rolling contact systems. The working of grain boundaries beneath the contact surface, where shear stress is at a maximum, generates damage. Fatigue cracks occur within this heavily stressed zone with repeated stress cycles. Particles are represents the depth of the zone of maximum shear stress. The fatigue cracks are started by focal points of oxide particles and stringers of impurities.

Where the lubricant film thickness becomes less than the surface finish of the moving or rolling surfaces, under high load, low speed or low lubricant viscosity, boundary lubrication comes into play which is dependent upon the chemical nature of the lubricant. The drop in fatigue life can be avoided under such conditions as well as surface wear with the proper lubricant additives.

Petroleum Lubricants

Petroleum based lubricants are extensively used because of their wide availability and consequent low cost. Petroleum lubricants are well known in the art and generally comprise low viscosity and low density paraffins having relatively high freezing points. When combined with oxidation inhibitors to obtain high temperature stability, oxidation resistance is improved and sludging tendency is minimized.

Aromatic petroleum lubricants such as napthenes are generally oxidation stable but form insoluble sludges at high temperatures. Napthenic oils have low pour point, low oxidation stability and properties between paraffins and aromatics. They are also present in paraffin lubricants to a small degree. Napthenic oils, however, or napthenes are used by themselves in combination with oxidation inhibitors. It therefore would be advantageous to provide additives that minimize these difficulties.

Representative petroleum lubricating oils include SAE types 10W, 20W, 30, 40, 50, 10W-30, 20W-40, 75, 80, 90 140, 250 and so-called automatic transmission fluids.

Additives

Various additives mixed with lubricating materials help meet the requirements of modern automobile engines, high-speed machinery, high-pressure hydraulic systems, torque converters, aircraft engines, turbine engines, steam engines, steam turbines, electric motors, hydraulic systems and the like.

Petroleum lubricants and other so-called oil-type lubricants employ sulfur, nitrogen or phosphorous type organic compounds, and alkylphenols as antioxidants or oxidation inhibitors. Hydroperoxides initially formed in the oil during oxidation lead to the subsequent production of organic acids and other oxygen containing organic compounds. Antioxidants either inhibit the formation of, or complex, hydroperoxides to minimize the formation of acids, sludge and varnish.

Some commonly employed oxidation inhibitors for steam turbines, electric motors and hydraulic systems include 2-naphthol, di-t-butyl-p-cresol and phenyl-1-naphthylamine. Thiophosphates such as zinc, barium, and calcium thiophosphate are also widely used as antioxidants in lubricating oils for automobile and truck engines.

Alkylsuccinic type acids and other mildly polar organic acids or organic amines are employed as rust inhibitors as well as organic phosphates, polyhydric alcohols, sodium sulfonates and calcium sulfonates.

Many antiwear compounds, generally well known in the art, improve boundary film lubrication, and are classified into seven main groups. The first comprises compounds containing oxygen, such as fatty acids, esters and ketones; the second comprises compounds containing sulfur or combinations of sulfur and oxygen; the third comprises organic chlorine compounds such as chlorinated wax; the fourth includes organic sulfur compounds such as sulphurized fats and sulphurized olefins; the fifth comprises compounds containing both chlorine and sulfur; the sixth, compounds containing organic phosphorous compounds such as tricresyl phosphate, thiophosphates, and phosphites; and the seventh, organic lead compounds such as tetraethyl lead. The use of olefins for lubricating aluminum moving surfaces and iodine for high temperature alloys has also been described in the art.

Antiwear agents employed in boundary lubricants include mildly polar organic acids such as alkylsuccinic type acids and organic amines. Tricresyl phosphate or zinc dialkyldithiophosphate additives are employed in lubricants for hydraulic pumps, gears and torque converters whereas severe rubbing conditions encountered in high load metal-to-metal moving surfaces require lubricants and especially oil type lubricants containing active sulfur, chlorine and lead compounds. These extreme-pressure additives enter into a chemical reaction to form compounds on the surface of the metal moving parts such as lead sulfide, iron chloride or iron sulfide.

Detergents and dispersants are employed in lubricants and function by adsorption on any insoluble particles formed by the moving or sliding contact of two or more surfaces, and maintain the particles in suspension in the lubricant. This minimizes deposits on the moving surfaces and enhances the cleanliness of the moving surfaces. Detergents such as alkyl methacrylate polymers having polar nitrogen groups in the side chain are generally employed and are well known in the art.

The addition of pour-point depressants such as polymethacrylates or wax with naphthalene or wax phenol condensation products also improves the properties of lubricants.

Many lubricants also contain viscosity-index improvers such as polyisobutylenes, polymethacrylates and poly(alkylstyrenes) having a molecular weight of from about 5000 to 20,000. The addition of foam inhibitors such as methyl silicone polymers in lubricating fluids and especially oil type lubricants reduces frothing.

Synthetic Lubricants

Another class of lubricants comprises synthetic oils such as low molecular weight polymerized olefins, ester lubricants, polyglycols and silicones, all of which are widely known in the art. Other synthetic oils include tricresyl phosphate, silicones, other organic phosphates, polyisobutylene, polyphenyl ethers, silicates, chlorinated aromatics, and fluorocarbons.

The silicone lubricants generally comprise low molecular weight polymers or di-organo substituted silicon oxide where the organo groups are ethyl groups, phenyl groups or mixtures thereof and are formulated either as room temperature liquids having the viscosity of oil or compounded into greases. The chlorophenyl methyl silicone oils are especially suitable.

Organic esters generally comprise diesters based on the condensation of long chain diacids having from about 6 to about 10 carbon atoms such as adipic, azelaic or sebacic acid with branched-chain alcohols having from about 8 to about 9 carbon atoms. Higher temperature lubricants employed for turbines and especially jet engines comprise esters of trimethylolpropane or pentaerytheritol with these acids. Polymethacrylates thickening agents, sometimes added in amounts up to 5%, increase the viscosity of these fluids, which is somewhat lower than petroleum oils.

The polyglycol lubricants comprise those based on polypropylene glycol prepared from propylene oxide and contain terminal hydroxyl groups. These are water insoluble lubricants. Mixtures of propylene and ethylene oxides in the polymerization process will produce a water soluble polymer, also used as a lubricant. Liquid or oil type polyglycols have lower viscosities and molecular weights of about 400, whereas 3,000 molecular weight polyglycols are viscous polymers at room temperature. The use of mono- or polyhydric, such as dihydric, alcohols in the ethylene oxide and/or propylene oxide polymerization results in the formation of mono- or diethers which yield a different class of polyglycols. Esterifying the hydroxyl groups in the polyols with low or high molecular weight acids, i.e., those having up to about 18 carbon atoms gives another variety of polyglycol lubricants.

The polyglycols are employed in various industrial hydraulic fluid applications. They generally do not dissolve rubber and find use as rubber lubricants or as textile fiber lubricants in textile processing. Because they decompose into volatile products at high temperatures they also find use in once-through lubrication systems such as in jet aircraft engines and other high temperature operations that would result in depositing carbonaceous materials on the moving surfaces and consequent operational and maintenance difficulties. Combining water soluble polyglycols with water provides compositions for use in hydraulic applications such as die casting machines, furnace controls, electric welders, and navy hydraulic catapults, as well as equipment handling for missiles.

The phosphate lubricants find use in fire resistance applications and generally comprise triaryl or trialkyl phosphates. Fire resistance applications include die casting machines, aircraft hydraulic fluids, air compressor lubricants and various naval and industrial systems. Blending the phosphates with chlorinated biphenyls provides hydraulic stability.

Polymerization of isobutylene containing smaller amounts of 1-butene and 2-butene provides polybutylene lubricants ranging in viscosity from 5 to over 600 centistokes at 210° F. with a chain length of from about 20 to greater than about 100 carbon atoms. Polyisobutylenes find application in high temperature apparatus such as conveyors, ovens, dryers and furnaces since they decompose and oxidize substantially to entirely volatile by-products leaving no carbon residue contrary to petroleum based lubricants. They find use in electrical transformers, cables, and refrigerator compressors with the higher viscosity grades employed as viscosity-index additives in petroleum lubricants.

Polyphenyl ethers or polyphenoxy polymers, with the ether group in the three phenyl position in the polymer chain find use in high temperature applications such as jet engines and hydraulic systems since they exhibit temperature stability at about 500° F.

Silicate ester high temperature hydraulic fluids generally comprise tetra(2-ethylhexyl) and tetra(2-ethylbutyl) silicates as well as the so-called dimer silicates such as hexa(2-ethylbutoxy) disiloxane.

Chlorinated bi-phenyl fluids provide fire resistance for lubricating fluids and hydraulic fluids.

Fluorocarbons such as polychlorotrifluoroethylene and copolymers of perfluoroethylene perfluoropropylene non-solid lubricants provide high oxidation resistance in lubricating liquid oxygen and hydrogen peroxide manufacturing and handling equipment.

Greases

Greases comprise high viscosity lubricating fluids, made by combining a petroleum or synthetic lubricating fluid with a thickening agent. The thickeners generally comprise fatty-acid soaps of lithium, calcium, strontium, sodium, aluminum, silica gel, and barium. The grease formulation may also include coated clays such as bentonite and hectorite clays coated with quaternary ammonium compounds. Sometimes carbon black is added as a thickener to improve high-temperature properties of petroleum and synthetic lubricant greases. The addition of organic pigments and powders which include arylurea compounds indanthrene, ureides, and phthalocyanines provide high temperature stability.

Grease additives generally fall into the same category as the additives employed in petroleum lubricants including amine, phenolic, phosphite, sulfur, and selenium oxidation inhibitors. Amine deactivators are also employed where copper staining would be a problem or where copper would tend to promote catalytic oxidation. Amine salts, metal sulfonates, metal naphthenates, esters, and nonionic surfactants provide added water resistance, and some protection against salt-spray corrosion.

Greases employed in gear applications or sliding surface applications contain extreme-pressure additives such as lead soaps, sulfur, chlorine and phosphorous additives as described above. Adding solid powders such as graphite, molybdenum disulfide, asbestos, talc, and zinc oxide provides boundary lubrication.

Glycerol stabilizes the soap structure when used in combination with small amounts of water as well as dimethylsilicone oil to minimize foaming.

Formulating the foregoing synthetic lubricants with thickners provides specialty greases and include, without limitation, polyglycol, diester, silicone-diester, polyester, and silicone lubricants. Nonmelting thickeners are especially preferred such as copper phthalocyanine, arylureas, indanthrene, and organic surfactant coated clays. The organic esters and the silicone greases are generally employed in military applications especially for high temperature use.

The mechanical properties of greases have been measured and those materials having a NLGI number from 0 to 6 characterize these greases.

Solid Lubricants

Solid lubricants include inorganic compounds, organic compounds, and metal in the form of films or particulate materials to provide barrier-layer type of lubrication for sliding surfaces. These materials are substantially solid at room temperature and above, but in some instances will be substantially liquidus above room temperature.

The inorganic compounds include materials such as cobalt chloride, molybdenum disulfide, graphite, tungsten disulfide, mica, boron nitride, silver sulfate, cadmium chloride, cadmium iodide, borax and lead iodide. These compounds exemplify the so-called layer-lattice solids in which strong covalent or ionic forces form bonds between atoms in an individual layer while weaker Van der Waal's forces form bonds between the layers. They generally find use in high temperature applications because of their high melting points, high thermal stabilities in vacuum, low evaporation rates, and good radiation resistance. Especially suitable materials include formulated graphite and molybdenum disulfide. Both molybdenum disulfide and graphite have layer-lattice structures with strong bonding within the lattice and weak bonding between the layers. Sulfur-molybdenum-sulfur lattices form strong bonds whereas weak sulfur-sulfur bonds between the layers allow easy sliding of the layers over one another. Molybdenum disulfide and graphite are therefore especially important solid inorganic lubricants.

The particulate solid materials are formulated as colloidal dispersions in either water, wax, wax emulsions, petroleum oil, castor oil, mineral spirits. The solid non-particulate materials may be employed as solutions in solvents selected to dissolve the solids to form a substantially liquidus composition at room temperature. These solutions in turn can be made into emulsions as described herein, especially water emulsions. Where solvents are unavailable or difficult or expensive to use, the solid a lubricants are used as particulates.

The emulsions, as that term is used herein, are either water in oil or oil in water emulsions, or oil in oil emulsions where the solution is either the continuous or discontinuous phase. Water dispersions are used for lubricating dies, tools, metalworking molds, oxygen equipment and in wire drawing.

Graphite-water dispersion used as a lubricant lose water due to evaporation, which is a disadvantage. Mixing the graphite with cadmium oxide or molybdenum disulfide overcomes this.

Other suitable inorganic materials that do not have the layer-lattice structure include basic white lead or lead carbonate, zinc oxide, and lead monoxide.

Dispersing the inorganic compounds in various liquids such as lower molecular weight alcohols, glycols, petroleum oils, synthetic oils, and water, provides compositions used in airframe lubrication, fastenings such as nuts and bolts or screws, gears, wire drawing, and lubricating fittings.

Solid organic lubricant compounds comprise high melting organic powders such as phenanthrene, copper phthalocyanine, and mixtures with inorganic compounds and/or other lubricants. Copper phthalocyanine admixed with molybdenum disulfide comprises a good roller bearing lubricant.

The metal lubricants generally comprise soft metals such as gallium, indium, thallium, lead, tin, gold, silver, copper and the Group VIII noble metals, ruthenium, rhodium, palladium, osmium, iridium, and platinum. Forming these metal lubricants into particulate dispersions in a fluid and especially a liquid such as a liquid lubricant as described herein including petroleum oils, synthetic oils, and water provides easily applied lubricant compositions. Chalcogenides of the non-noble metals may also be employed, especially the oxides, selenides, or sulfides.

Combining the solid lubricants with various binders keeps them in place on the moving surface. Binders are especially necessary in dry lubricant applications employing solid or particulate lubricants, and are sometimes described as bonded solid lubricants. Various thermosetting and thermoplastic and curable binder systems include phenolic, vinyl, acrylic, alkyd, polyurethane, silicone, and epoxy resins. It would be an advantage, however, to provide a novel binder that performed in the same way or improved on the function of these binders.

These types of coatings find application as lubricants for fasteners and bolt assemblies. The solid lubricants employed in the latter application usually include silver, nickel, copper, molybdenum disulfide, lead, or graphite.

Metal Working Lubricants

Metal working is another important area of lubrication metal working which generally comprises operations involving machining, grinding, honing, lapping, stamping, blanking, drawing, spinning, extruding, molding, forging, and rolling. The lubricants employed generally comprise water, mineral oils, fatty oils, and fatty acids, waxes, soaps, various chemical compounds, minerals, and synthetic lubricants as described herein. Some of the foregoing materials will be at a disadvantage because they do not have the proper sticking properties or viscosity properties to remain in place on the metal surfaces during working and accordingly have to be formulated to assure that they will be in place during the metal working operation. The addition of synthetic polymers to these lubricants would overcome some of these disadvantages.

Lubricants are also described by Kirk-Othmer Encyclopedia of Chemical Technology, Second Edition, pp. 559-595 which is incorporated herein by reference.

For the purpose of the present invention, all of the foregoing lubricant compounds or composition will be referred to as materials for decreasing friction between moving surfaces or lubricants.

From the foregoing, it should be apparent that there is a need for additional materials that will provide the same advantages as those of the related art as well as additional advantages and also materials that will overcome some of the various disadvantages of the related art.

Accordingly, the present invention is directed to a novel composition which includes a material for decreasing friction between moving surfaces as well as a method for lubricating a surface.

SUMMARY OF THE INVENTION

These and other advantages are obtained according to the present invention, which is the provision of a composition and a process to enhance the various advantages of the related art and which also substantially obviate one or more of the limitations and disadvantages of the described prior compositions of matter and processes.

The description which follows sets forth additional features and advantages of the invention, apparent not only from the description, but also by practicing the invention. The written description and claims hereof particularly point out the objectives and other advantages of the invention and show how they may be realized and obtained.

To achieve these and other advantages, and in accordance with the purpose of the invention, as embodied and broadly described, the invention comprises a lubricant composition of matter comprising a superabsorbent polymer combined with a material for decreasing friction between moving surfaces or a lubricant as described herein. Where the lubricant is water or a petroleum oil, the composition also includes an additive such as described herein including without limitation, an oxidation inhibitor, a rust inhibitor, antiwear agent, detergent-dispersant, pour-point depressant, viscosity-index improver or foam inhibitor, especially those described herein.

The invention also comprises a method of lubricating a surface comprising coating the surface with a lubricating composition comprising a superabsorbent polymer combined with a material for decreasing friction between moving surfaces as described herein; however, the method of the invention includes the use of water or oil as lubricants as well as other lubricants either with or without additives as described herein. In a further embodiment, the invention relates to the controlled delivery of a lubricant to a surface in order to decrease friction between moving surfaces, by applying the lubricant composition of the invention to at least one of such surfaces.

The composition, process, process of producing a product, and product produced thereby of the invention employ inter alia a solid inorganic lubricant as the material for decreasing friction.

The invention also comprises a process for manufacturing the aforesaid lubricant composition for decreasing friction between moving surfaces by combining a lubricant with a superabsorbent polymer. In those instances where the various components of the lubricant composition react with one another and their identity in the final composition is difficult or impossible to partially or completely ascertain, a product is produced according to the invention which is made by the inventive process. The invention, therefore, also relates to a novel product produced by the process of the invention.

The invention also relates to a process comprising controlling the delivery of a lubricant to at least one of two moving surfaces in order to decrease friction between said moving surfaces, comprising applying a lubricant composition or product produced according to the process of the invention to at least one of said surfaces. It is intended that applying the lubricant composition or the product produced according to the invention to at least one of the surfaces is to include those instances where one, some, or all of the surfaces are stationary, or one, some, or all of the surfaces are moving, but in any event, such surfaces are or will be frictionally engaged with one another.

Applicant intends that controlling the delivery of the lubricant to a surface includes phenomena where the lubricant is incrementally withdrawn incrementally released incrementally delivered or incrementally applied from the lubricant composition of matter or the product produced by the process of the invention. In another embodiment, controlling delivery can be effected by one of the surfaces skimming a microscopic layer, and in some instances one or more molecular layers of the lubricant composition or product produced by the process of the invention from at least one other surface and leaving the remainder of the composition or product on at least one other surface.

In another aspect of the invention, the various lubricants can act as plasticizers for the superabsorbent polymer, especially the organic lubricants and particularly those organic lubricants that are liquids at about 15 to about 30° C. Where the lubricants comprise the so-called MORFLEX®, CITROFLEX®, and AROSURF® compounds, as those compounds are defined herein, they especially include various lubricant additives as defined herein.

Throughout the written description and claims, the lubricant composition is described as a superabsorbent polymer combined with a material for decreasing friction between moving surfaces or lubricant, by which it is intended that the superabsorbent polymer and the lubricant either form a solution, a dispersion, or an emulsion including both water in oil emulsions as well as oil in water emulsions, and oil in oil emulsions wherein a solution is emulsified, and where the solution can be the continuous phase or the discontinuous phase.

The superabsorbent polymer employed according to the invention, absorbs from about 25 to greater than 100 times its weight in water and comprises a polymer of acrylic acid, an acrylic ester, acrylonitrile or acrylamide, including co-polymers thereof or starch graft copolymers thereof, or mixtures thereof, where the mixtures contain from 2 to about 3 or 4 superabsorbent polymers.

Superabsorbent polymers that may be employed in the present invention comprise those generally described and those specifically set forth by Levy in U.S. Pat. Nos. 4,983,389, 4,985,251, and particularly those described in U.S. Pat. No. 4,983,389, in column 9, lines 37-48, column 10, lines 40-68, and column 11, lines 1-21 as well as those also described in U.S. Pat. No. 4,985,251, column 9, lines 1-30. The various U.S. patents to Levy, are incorporated herein by reference for their teachings relative to the superabsorbent polymers.

Other superabsorbent polymers include AQUASORB® which are copolymers of acrylamide and sodium acrylate or the potassium or ammonium salts thereof; AQUASORB® which are acrylamide-sodium polyacrylate cross-linked copolymers; AQUASTORE™ which is an ionic polyacrylamide, and cross-linked modified polyacrylamides, TERRASORB™ which is a hydrolyzed starch-polyacrylonitrile; SANWET® which is a starch-graft-sodium-polyacrylate, or a polyurethane with starch-graft-sodium polyacrylate, starch-graft-sodium polyacrylate, starch, polymer with 2-propenoic acid, sodium salt, WATER LOCK® which is a poly-2-propenoic acid, sodium salt, and a starch-g poly(2-propenamide-co-2-propenoic acid, sodium salt) or mixed sodium and aluminum salts or potassium or a 2-propenoic acid, sodium salt or polyacrylamide-co-sodium acrylate); AQUAKEEP® which is a polyacrylic acid, sodium salt, AGRI-GEL™ which is an acrylonitrile starch graft copolymer, SGP® 502S which is a starch-g-poly(acrylamide-co-sodium acrylate; STOCKOSORB® which comprise acrylate/acrylamide copolymers, acrylate/polyvinyl alcohol copolymers, and polyacrylates, and the various sodium and potassium salts thereof, FAVOR® C which is a potassium polyacrylate/polyacrylamide copolymer; XU 40346.00 from Dow Chemical which is a partial sodium slat of cross-linked polypropenoic acid; ASAP™ 1000 which is a reaction product of lightly cross-linked sodium polyacrylate in water with hydrophobic amorphous silicon dioxide, and acrylic acid, ARIDALL® which are sodium or potassium polyacrylates that may be lightly cross-linked, SANWET® which is a starch grafted sodium polyacrylate, NORSOCRYL® which is a poly(sodium acrylate) homopolymer, and ALCOSORB™ which is a copolymer of acrylamide and sodium acrylate, and the various superabsorbent polymers described by Takeda et al. U.S. Pat. No. 4,525,527; Mikita et al. U.S. Pat. No. 4,552,938; U.S. Pat. No. 4,618,631; Mikita et al. U.S. Pat. No. 4,654,393; Alexander et al. U.S. Pat. No. 4,677,174; Takeda et al. U.S. Pat. No. 4,612,250; Mikita et al. U.S. Pat. No. 4,703,067; and Brannon-Peppas, *Absorbent Polymer Technology*, 1990. Other superabsorbent polymers may be employed which are further described by Buchholz et al., *Superabsorbent Polymers, Science and Technology*, 1994 ACS. All of the foregoing are incorporated herein by reference.

The invention also includes the addition of other materials to the superabsorbent polymer to enhance its loading characteristics, and includes hygroscopic materials such as acrylic acid copolymers (e.g., PEMULEN® TR-1), and the various inorganic or organic art known equivalents thereof, especially the organic hygroscopic materials. Other organic hygroscopic materials in this respect include glycerol, and the various soaps, especially those described herein, and may also be employed, as well as mixtures of hygroscopic materials, especially the 2 to about 3, or about 4 component mixtures.

Mixtures of these hygroscopic materials with the superabsorbent polymers may also be employed, especially the 2 to about 3, or about 4 component mixtures.

In one embodiment, the material for decreasing friction comprises a petroleum lubricant containing an additive, water containing an additive, synthetic lubricant, grease, solid lubricant or metal working lubricant, wherein said synthetic lubricant, grease, solid lubricant or metal working lubricant optionally contain an additive. Lubricating oils include either a petroleum oil or synthetic oil or synthetic organic liquid as described herein including without limitations petroleum lubricants including the paraffins, aromatics, naphthenic oils, the synthetic oils, including the silicones, organic esters, polyglycols, phosphates, polyisobutylenes, polyphenol ethers, silicates, chlorinated aromatics, and fluorocarbons all as described herein.

The greases, solid lubricants, and metal working lubricants are also as described herein.

Various mixtures of each of the foregoing lubricants may be used including mixtures of 2 to about 3 or about 4 lubricants.

As noted before, additives described herein are also employed according to the invention. The composition of matter includes additives where petroleum oil or water is used as a lubricant, whereas the method of the invention of lubricating a surface includes the use of superabsorbent polymers in combination with the lubricants described herein, with or without the additives.

The material for decreasing friction between moving surfaces or lubricant employed according to the present invention also includes water or combinations of water and oil whether petroleum oils or synthetic oils as those materials are described herein. When water is used in combination with oil, it generally is employed as an emulsion whether a water in oil emulsion or an oil in water emulsion, both of which are well known in the art and are manufactured by methods that are similarly well known.

The invention also relates to a superabsorbent polymer combined with a solid or particulate inorganic lubricant such as those described herein including mixtures of solid or particulate inorganic lubricants especially mixtures of 2 to about 3 or about 4 solid or particulate inorganic lubricants.

In one embodiment, these inorganic lubricants comprise graphite, the chalcogenides of molybdenum, antimony, niobium, and tungsten, where the chalcogens comprise oxygen, sulfur, selenium, and tellurium and especially molybdenum disulfide, cobalt chloride, antimony oxide, niobium selenide, tungsten disulfide, mica, boron nitride, silver sulfate, cadmium chloride, cadmium iodide, borax, basic white lead, lead carbonate, lead iodide, asbestos, talc, zinc oxide, carbon, babbit, bronze, brass, aluminum, gallium, indium, thallium, thorium, copper, silver, gold, mercury, lead, tin, indium, or the Group VIII noble metals.

Chalcogenides of the non-noble metals may also be employed, especially the oxides, selenides or sulfides. In another embodiment, the inorganic solid or particulate material comprises a phosphate such as a zinc phosphate, iron phosphate, or manganese phosphate, or mixtures thereof. Mixtures of the solid or particulate lubricants can be used, especially the 2 component 3 or about 4 component mixtures.

The superabsorbent polymers are also combined with a solid or particulate organic lubricant including mixtures of the organic lubricant and especially 2 to about 3 or about 4 component mixtures.

The solid or particulate organic lubricant comprises phenanthrene, copper phthalocyanine, a fluoroalkylene homopolymer or copolymer such as polytetrafluoroethylene, polyhexafluoroethylene, or copolymers of perfluoroethylene and perfluoropropylene. Homopolymers of polyvinylidene fluoride or copolymers of polyvinylidene fluoride and hexafluoropropylene may also be employed as well as other fluorinated polymers which are well-known in the art. The solid or particulate organic lubricant may also include alkylene homopolymers or copolymers such as polymers of ethylene, propylene, isopropylene, butylene, and isobutylene and the various copolymers thereof especially the 2 or 3 component copolymers thereof. The solid or particulate) organic lubricant may also include a paraffinic hydrocarbon wax. Various mixtures of the solid or particulate organic lubricants may also be employed, especially the 2 to about 3 or about 4 component mixtures.

Combinations of the solid or particulate inorganic lubricant and the solid or particulate organic lubricant can also be employed, especially the 2 to about 3 or 4 component combinations. Both the solid or particulate inorganic lubricant and the solid or particulate organic lubricant may also be combined with room temperature liquid materials for decreasing friction between moving surfaces such as oil lubricants and/or synthetic lubricants as described herein or water or combinations of water and oil (including the synthetic lubricants) as described herein.

The solid or particulate inorganic lubricant or solid or particulate organic lubricant can also be used in combination with the superabsorbent polymers either as a mixture of powdered super absorbent polymer with solid or particulate organic lubricant or where the superabsorbent polymer is admixed with water or oil or both as described herein.

The superabsorbent polymer is also combined with a material for decreasing friction which comprises a metal working lubricant containing water or an emulsion of oil and water where the oil is either a petroleum oil or synthetic oil but especially a mineral oil and the emulsion comprises either a water in oil or an oil in water emulsion, the petroleum oils, and synthetic oils having been described herein. The metal working lubricant containing water may also comprise a solid or particulate inorganic or organic lubricant and water where the solid or particulate lubricants are as described herein.

The lubricant compositions of the present invention and the lubricant compositions used according to the method of the invention may comprise room temperature liquid compositions having SAE viscosities as described herein or may have the consistency of grease as that term and those consistencies are described herein.

Throughout the written description and claims, the lubricant is described as a material for decreasing friction between moving surfaces by which it is meant that the material comprises either a compound or composition of matter or mixtures of a compound and a composition of matter.

The average particle size of the particulate inorganic lubricant or organic lubricant or the superabsorbent polymer may be anywhere from about <0.5 microns to about 300 microns or about 0.001 in. to about 0.3 in. and especially from about 0.005 in. to about 0.2 in. The superabsorbent polymer (as well as the lubricant composition) may also be in the form of flakes or sheets.

The lubricant composition can be either a liquid, including a viscous liquid, or gel, or a solid, whether rigid, semi-rigid or flexible at room temperature. Solid lubricant compositions also include a powdered lubricant composition. One of the outstanding features of the lubricant composition is that it can be shaped by any conventional molding or extruding process to form discs, sheets, rods, blocks, powders, or filaments, and especially solid lubricant compositions that can be formed to the contours of the surface or surfaces that are being lubricated.

Additionally, multiple dry films of the same or different lubricant composition may also be prepared, i.e. laminar structure lubricants where the layers of the laminate are anywhere from about 2 to about 25 mils thick. These laminates may also have some laminar layers based only on the superabsorbent polymer, or the lubricant, and the balance on the lubricant composition. Additionally, the same or different lubricant composition laminar layers may be used.

The superabsorbent polymer is used in combination with the lubricant in an amount anywhere from about 0.001 wt % to about 99 wt %, and especially from about 0.1 wt % to about 85 wt %, or from about 0.2 wt % to about 75 wt %, based on the combination of lubricant (with or without lubricant additives, or other additives) and superabsorbent polymer. In one experiment, the superabsorbent polymer is combined with about 350 times its weight of powdered graphite. Powders having an average particle size of about minus 325 mesh are taken up by some of the superabsorbent powders.

The lubricant and additives, when employed, are combined with the superabsorbent polymer by swelling the polymer either by itself or dispersed with the lubricant (and additives when employed), either in water or in a high humidity environment, e.g. 80% R.H.

Prior to, or after exposing the superabsorbent polymer to water or humidity, the polymer, in the form of a powder, flakes or granules is mixed with the lubricant in a conventional mixer, such as a HOBART™ mixer until a uniform dispersion is obtained. This process may be facilitated by employing a solvent or dispersant for the lubricant, preferably in some instances, one that will be easily driven off from the lubricant composition of the invention, such as a ketone, especially the lower alkyl ketones e.g. acetone MEK, MIBK, DIBK, and the like.

The lubricant then combines with, is entrapped by or is taken up by the superabsorbent polymer that has been swollen with water or in high humidity. The lubricant composition is then dried to remove the water, for example by placing it in a 27-38% R.H. environment, or under vacuum or at elevated temperatures. This removes substantially all of the water introduced in the first part of the process.

The lubricant composition, prior to removal of water as described herein, or after removal of water is shaped by molding or extruding, and in the case of forming powdered or granular lubricants, is ground to mesh in a conventional grinding mill after the water has been removed.

Another outstanding feature of the lubricant compositions is their ability, under pressure to release the lubricant as a film or drop, or droplets, such as microdroplets and to recapture the released lubricant after pressure is released or ceases. The superabsorbent polymers of the lubricant compositions in this regard were discovered to have sponge like properties, even though no sponge like characteristics, such as porosity is visible to the naked or unaided eye, when examining the lubricant compositions. However, other matrix compositions can be formulated to have porous characteristics that are plainly visible.

A lubricant composition is made in the foregoing manner employing graphite, as noted above, or a 2 mol ethoxylate of isostearyl alcohol (AROSURF® 66 E2). Although the latter is used as a surfactant, it also has some lubricating characteristics and is to be considered as a lubricant as well for the purpose of the present invention.

Other solid fillers, adjuvants and diluents can be used in combination with the lubricants employed in the lubricant composition of the present invention, including surfactants, liquid extenders, solvents and the like.

Additional Examples Illustrative of Manufacturing Procedures for Controlled-Delivery Superabsorbent Polymer-Based Lubricant Compositions or Devices I. Admixtures of Superabsorbent Polymers and Lubricants or Lubricant Formulations: Water-Free Compositions This procedure utilizes the microsponging and entrapment of water-based formulations (e.g., suspensions, emulsions, mixtures) of one or more solid (e.g., graphite and/or carbon) and/or liquid (e.g., petroleum and/or non-petroleum) lubricants, with or without additional lubricant additives by superabsorbent polymers. Lubricant additives can be chemically active and/or chemically inert and can include dispersants, solvents, detergents, anti-wear agents, extreme pressure agents, oxidation inhibitors, rust and corrosion inhibitors, emulsifiers, demulsifiers, pour-point depressants, surfactants, foam inhibitors, viscosity improvers, and the like. Superabsorbent polymers can be in powdered, flaked, granular, composites, extruded, or other forms prior to admixing with the water-based lubricant formulations.

In this procedure, the hydrated superabsorbent polymers containing various concentrations of the lubricant formulations are dried to remove entrapped water by one or more standard techniques (e.g., heat, low humidity, vacuum, chemicals, microwave, low temperature, freeze drying, and the like). Percentage loading of the aqueous solid and/or liquid lubricant components with or without any additional lubricant additives within a superabsorbent polymer matrix will be dependent on the type of superabsorbent polymer (e.g., starch grafted, acrylate, acrylamide, acrylate/acrylamide, and the like), the porosity of the superabsorbent polymer, the total water absorbency of the superabsorbent polymer, the speed of water absorbency, and the concentration and type of solid and/or liquid lubricant(s)/lubricant formulation used in the admixtures.

II. Admixtures of Superabsorbent Polymers and Lubricants or Lubricant Formulations: Water-Based Compositions This procedure utilizes the microsponging and entrapment of water-based formulations (e.g., suspensions, emulsions, mixtures, and the like) of one or more solid and/or liquid lubricants, with or without additional lubricant additives by one or more superabsorbent polymers. Superabsorbent polymers can be powdered, flaked, granular, composites, extruded, or other forms prior to admixing with the water-based lubricant(s) or lubricant formulations.

Hydrated superabsorbent polymers containing various concentrations of the lubricant formulation are in single units (e.g., granules) or fused masses (e.g., gels) of hydrogels of various viscosities, sizes, shapes, tensile strengths, and consistencies. The hydrogel form and/or viscosity of the superabsorbent polymer-based lubricant formulation will be dependent on the concentration of water, the concentration and type(s) of superabsorbent polymers, the water absorbency of the superabsorbent polymer(s), and the concentration and type(s) of solid and/or liquid lubricant(s) or lubricant formulations used in the aqueous admixtures.

III. Admixtures of Superabsorbent Polymers and Lubricants or Lubricant Formulations: Agglomerated Water-Free Compositions This procedure consists of admixing one or more superabsorbent polymers (e.g., powders, flakes, granules) with one or more solid and/or liquid lubricants, with or without additional lubricant additives, and agglomerating the homogeneous or heterogeneous admixture compositions at various humidities, pressures, temperatures, and the like, by standard techniques to form solid unified pellets, extrusions, sheets, composites, pads, fibers, granules, laminates, and the like, in various shapes, sizes and structural consistencies (e.g., flexible, rigid or high/low tensile strength). The type of agglomerated composition will be dependent on the type and concentration of one or more superabsorbent polymers, the type and concentration of one more lubricant and lubricant additives, and the agglomeration procedures utilized in fabricating the lubricant composition.

IV. Admixtures of Monomers and Lubricants or Lubricant Formulations: Polymerization of Polymer/Lubricant Components This procedure consists of polymerizing the monomers utilized in the manufacturing of the superabsorbent polymers (i.e., with or without crosslinking agents) and one or more solid and/or liquid lubricants and lubricant additives into solid matrices (e.g., granules, flakes, pellets, powders, extrusions, and the like) that have lubricant components structurally integrated throughout the superabsorbent polymer network.

V. Admixtures of Superabsorbent Polymers and Lubricants or Lubricant Formulations with Crosslinking Agents In this procedure, agglomerated or non-agglomerated superabsorbent polymer-based lubricant compositions are admixed with crosslinking agents or additional crosslinking agents to impart different binding, release, coating, swelling, or other structural or matrix characteristics on the solid lubricant compositions.

Controlled-Delivery Superabsorbent Polymer-Based Lubricant

Compositions or Devices

The rate and duration of controlled delivery of one or more solid and/or liquid lubricants from a superabsorbent polymer-based solid matrix or liquid composition (various viscosities) by diffusion, exuding, deposition, and the like, is proportional to the physicochemical fluctuations in the superabsorbent polymer due to variations in temperature, pressure, compressions, abrasion, erosion, friction, biodegradation, humidity, electrical conductance, chemicals, and the like, acting on the lubricant composition utilized to reduce the friction between two or more moving parts.

Examples of superabsorbent polymer-based friction-reducing compositions or devices for use as solid and/or liquid lubricants can include the following:
A. Washers—pressure-sensitive, self-lubricating; flexible, semi-flexible, or rigid, and the like;
B. Friction reducing plates, pads, composites, agglomerates—self-lubricating, pressure-sensitive, abrasion-sensitive; flexible, semi-flexible, or rigid, and the like;
C. Bearings—self-lubricating, composites, metal-matrix composites, and the like;
D. Shock absorbers/struts/pressure pads/impact plates—self-lubricating, pressure-sensitive, and the like;
5. Shims or spacers;
6. Seals;
7. Gels or greases—variable-viscosity oil and/or water-based compositions.

Prefabricated superabsorbent polymer-based controlled delivery devices such as washers, pads, and the like, can be designed to be sensitive to various physicochemical forces such as pressure, temperature, abrasion and/or humidity, and therefore can be self-lubricating under stress. For example, under stress conditions, agglomerated superabsorbent polymer-based liquid lubricant compositions can exude small concentrations of the lubricant that is incorporated or entrapped in the superabsorbent polymer matrix to desired areas upon compaction or compression of the device. Upon compression, the device is reversible and can reabsorb excess lubricant fluid that is in immediate contact with the device, particularly in a closed system. Solid lubricants can be added to this system and delivered simultaneously with the liquid lubricants.

Prefabricated superabsorbent polymer-based devices or compositions containing solid lubricants can deposit the solid lubricant on desired surfaces, when, for example, vertical or horizontal friction (i.e., a sliding action) occurs across one or more planes of the device, and abrasion of the polymer-lubricant complex causes a deposit of the solid lubricant to be applied to the target surface. The amount of solid deposit will be directly proportional to the force applied to the superabsorbent polymer matrix.

The superabsorbent polymer alone can also act as a self-lubricating solid or liquid matrix when variations in the amount of moisture/humidity/water are applied to the superabsorbent polymer. Superabsorbent polymers become very slippery when activated by water, and will differentially absorb water based on the chemical constituents utilized in the polymerization process to manufacture the superabsorbent polymer. This water-activated action can provide an additional release and/or lubricating mechanism in certain situations when superabsorbent polymers are combined with one or more solid and/or liquid lubricants. For example, compaction and high humidity or humidity fluctuations can act on a superabsorbent polymer-based device to provide release of solid and/or liquid lubricants under a variety of use conditions. Also, the presence of one or more superabsorbent polymers in a solid or liquid lubricating system or device can act as a moisture scavenger to protect certain parts, and the like, from the affects of water or water migration.

Environments of Use for Superabsorbent Polymer-Based Lubricants

Closed Systems Vs. Open System Environments

Superabsorbent polymer-based lubricant compositions are composed of one or more hydrophilic components. Therefore, the optimum controlled delivery performance would be expected to be observed in closed or sealed systems that are not exposed to ambient conditions. Nevertheless, short-term lubricant performance can be expected in open environment systems.

Example 1

A series of granular superabsorbent polymer-based lubricant compositions are fabricated using microsponging and entrapment procedures. These procedures utilized prefabricated superabsorbent polymer granules (irregularly shaped) that ranged in size from ca. 1 to 3 mm in diameter. Carbon, graphite (ca.-325 mesh), and a combination of carbon and graphite are utilized in the compositions as examples of solid lubricants. Superabsorbent polymers used as matrices for the solid lubricants are SANWET® IM-1500 LP (starch grafted sodium polyacrylate), ARIDALL® 11250 (potassium polyacrylate, lightly crosslinked) and DOW® XU 40346.00 (partial sodium salt of crosslinked polypropenoic acid). PEMULEN®TR-1 (acrylic acid copolymer) is used in one series as a formulation or lubricant additive to enhance the loading characteristics of a superabsorbent polymer granule.

Solid lubricants are incorporated into the superabsorbent polymer granules in a time and temperature-dependent aqueous microsponging and entrapment protocol. The speed of granule absorption and the concentration of solid lubricant(s) or lubricant formulation entrapped within the superabsorbent polymer matrices are dependent on factors such as the type of superabsorbent polymer, porosity of the granules, water temperature, and the type and/or concentration of formulation and lubricant additives utilized in the admixture. Dehydration of the hydrated granules containing the lubricant(s) is accomplished by air drying at low humidity or by chemical drying in a series of solvent baths.

The following protocols are utilized to load the 3 types of superabsorbent polymer granules with the solid lubricant(s) or lubricant formulations.

SANWET® IM-1500 LP(a)—A formulation of 299.625 g (79.9% w/w) distilled water and 0.375 g (0.1% w/w) PEMULEN® TR-1 is mixed in 500 ml NALGENE® bottles on a STROKEMASTER® paint shaker for ca. 30 minutes. Then, 75 g (20% w/w) carbon (ca.-325 mesh) is added to the aqueous formulation and mixed on the paint shaker for ca. 5 minutes. To this mixture, 5 g (w/w) SANWET® IM-1500 LP superabsorbent polymer granules are added and shaking is continued for an additional 60 minutes. The fully swollen SANWET® IM-1500 LP granules containing the carbon, PEMULEN® TR-1, and water are sieved (30 mesh) and dried to remove the entrapped water for ca. 96 hr in a room maintained at ca. 27-38% RH and 23-26° C. Dehydrated granules are stored in plastic bottles. The granular controlled-release lubricant compositions consisted of 13.1% (w/w) SANWET® IM-1500 LP+86.4% (w/w) carbon+0.5% (w/w) PEMULEN® TR-1. SANWET® IM-1500 LP in a related experiment employed in an amount of 5.0087 grams is observed to increase, on a dry weight basis to 38.1043 grams, i.e., an increase in weight of 660.8% due to absorption of the carbon and PEMULEN® TR-1.

ARIDALL® 11250 (b)—A formulation of 24 g (80% w/w) distilled water, 3 g (10% w/w) graphite, and 3 g (10% w/w) carbon is heated to 80° C. in a 100 ml KIMAX® beaker on a hot plate. To this formulation, 0.4062 g ARIDALL® 11250 granules are added to the heated formulation for ca. 5 to 10 seconds. The beaker is then removed from the hot plate and vigorously swirled for ca. 30 seconds. The fully hydrated granules containing the carbon and graphite are then washed in the following series of 100 ml serial solvent baths to remove the water: 3 minutes in 10% acetone/90% distilled water; 3 minutes in 30% acetone/70% distilled water; 3 minutes in 50% acetone/50% distilled water; 3 minutes in 70% acetone/30% distilled water; 3 minutes in 90% acetone/10% distilled water; and 5 minutes in 100% acetone. Granules appeared to be ca. 90% dehydrated at this time. Granules containing the remaining water and solid lubricants are transferred to a low humidity room (27-38% RH and 23-26° C.) for 24-48 hr to assure that the granules are totally dry. Dehydrated granules are stored in glass vials. The granular controlled-release lubricant compositions consisted of 20.6% (w/w) ARIDALL® 11250+39.7% carbon (w/w) and 39.7% (w/w) graphite. The 0.4062 grams of ARIDALL® 11250 granules increased in weight to 1.9768 grams on a dry weight basis, an increase in weight of 386.7% due to absorption of graphite and carbon.

ARIDALL® 11250 (c)—Another formulation of 48 g of distilled water (80% w/w) and 12 g carbon (20% w/w) is heated to 80° C. in a 100 ml KIMAX® beaker on a hot plate. To this formulation, 0.8031 g ARIDALL® 11250 granules are added to the heated formulation for ca. 5-10 seconds. The beaker is then removed from the hot plate and vigorously swirled to ca. 30 seconds. The fully hydrated granules containing the carbon are then washed in the following series of 100 ml solvent baths to remove the water; 3 minutes in 10% acetone/90% distilled water; 3 minutes in 30% acetone/70% distilled water; 3 minutes in 50% acetone/50% distilled water; 3 minutes in 70% acetone/30% distilled water; 3 minutes in 90% acetone/10% distilled water; and 5 minutes in 100% acetone. Granules appeared to be ca. 96% dehydrated at this time. Granules containing the remaining water and solid lubricant are transferred to a low humidity room (27-38% RH and 23-26° C.) for 24-48 hr to assure that the granules are totally dry. Dehydrated granules are stored in glass vials. The granular controlled-release lubricant compositions consisted of 30.8% (w/w) ARIDALL® 11250+69.2% (w/w) carbon. The 0.8031 grams of ARIDALL® 11250 granules increased in weight to 2.6101 grams on a dry weight basis, i.e. an increase in weight of 225% due to the absorption of carbon.

ARIDALL® 11250 (d)—In another formulation, 27 g (90% w/w) distilled water, 1.5 g (5% w/w) carbon and 1.5 g (5% w/w) graphite are heated to 80° C. in a 100 ml KIMAX® beaker on a hot plate. To this formulation, 0.4023 g ARIDALL® 11250 granules are added to the heated formulation for ca. 5-10 minutes. The beaker is then removed from the hot plate and vigorously swirled for ca. 40 seconds. The fully hydrated granules containing the carbon and graphite are then washed in a NALGENE® bottle containing 500 ml of 2-propanol for ca. 15 minutes. Granules appeared to be ca. 75% dehydrated at this time. Granules containing the remaining water and solid lubricants are transferred to a low humidity room (27-38% RH and 23-26° C.) for 24-48 hr to assure that the granules are totally dry. Dehydrated granules are stored in glass vials. The granular controlled-release lubricant compositions consisted of 44% (w/w) ARIDALL® 11250+28% (w/w) carbon and 28% (w/w) graphite. The 0.4023 grams of ARIDALL® oven 250 increased in weight to 0.9144 grams on a dry weight basis, i.e. an increase in weight of 127.3% due to the absorption of carbon and graphite.

DOW® XU 40346.00 (e)—A formulation 57 g (95% w/w) distilled water and 3 g (5% w/w) graphite is heated to 80° C. in a 100 ml KIMAX® beaker on a hot plate. To this formulation, 0.8022 g DOW® XU 40346.00 granules are added to the heated formulation for ca. 4 minutes. The beaker is then removed from the hot plate and vigorously swirled for ca. 30 seconds. The fully hydrated granules containing the graphite are sieved (30 mesh) and transferred to a low humidity drying room (27-38% RH and 23-26° C.) for 48 hr to remove the entrapped water. Dehydrated granules are stored in glass vials. The granular controlled-release lubricant compositions consisted of 40.6% (w/w) DOW® XU 40346.00+59.4% (w/w) graphite. The 0.8022 grams of DOW® XU 40346.00 increased in weight to 1.9750 grams on a dry weight basis, i.e., an increase of 146.2% due to the absorption of graphite.

Example 2

A series of agglomerated (i.e., granules, briquets or disquets) superabsorbent polymer based lubricant compositions are fabricated using mixing and compaction procedures. Agglomeration procedures utilized prefabricated superabsorbent polymer powders that ranged in sizes from ca. 1 to 300 microns in diameter. Non-petroleum oils or surfactants such as AROSURF® 66-E2 (POE(2) isostearyl alcohol; Sherex Chemical Co., Inc.), petroleum oils such as MARVEL® Mystery Oil (MARVEL Oil Company, Inc.) or ROYCO® 481 Oil (Grade 1010; Royal Lubricants Co., Inc.) and/or citrate esters (CITROFLEX®/MORFLEX® products) such as CITROFLEX® A-4 (acetyltri-n-butyl citrate; MORFLEX, Inc.) are utilized in the agglomerated compositions as examples of liquid lubricants. It should be noted that in addition to having lubricating characteristics, AROSURF® 66-E2 and CITROFLEX® A-4 are also used as formulation/lubricant additives (i.e., plasticizers) to provide various degrees of flexibility or elastomeric characteristics to the agglomerated matrices. Superabsorbent polymers used as matrices for the liquid lubricants are WATER LOCK® A-100, A-120, A-140, A-180, and A-200 (starch-g-poly(2-propenamide-co-2-propenoic acid, sodium salt)), SUPERSORB® (starch acrylonitrile copolymer), FAVOR® CA 100 (crosslinked potassium polyacrylate/polyacrylamide copolymer), STOCKOSORB® 400 F (crosslinked potassium polyacrylate/polyacrylamide terpolymer), and AQUAKEEP® J-500 (acrylic acid, polymers, sodium salt). Liquid lubricants and formulation/lubricant additives are agglomerated into granules, disquets or briquets in a series of time, moisture, and solvent-dependent admixing and agglomeration procedures. The physicochemical characteristics of the controlled-delivery lubricant composition fabricated in the agglomeration process is observed to vary with the type and concentration of superabsorbent polymer(s), solvent(s), lubricant(s), and formulation/lubricant additive(s) utilized in the admixtures. Additional matrix variations are observed by altering formulation moisture, the order of component admixing, the degree of compaction of the formulation components, and the mixing speed and shear used to blend the formulation components. Vigorous mixing of the formulation components is utilized to effect solvent (e.g., acetone and/or 2-propanol) evaporation.

In several admixtures, the powdered formulations are agglomerated into granules that ranged in size from ca. 0.5-5 mm in diameter upon evaporation of the solvent(s), while in other admixtures a powdered composition remained upon evaporation of the solvent. Solvent-free compositions are then placed into molds and compacted by hand or solvent-based compositions are poured into molds before all the solvent is driven off and not compacted. Granular and powdered superabsorbent polymer-based lubricant compositions are cured at high humidity and then dried at low humidity to remove entrapped moisture.

The following admixing and agglomeration protocols are utilized to fabricate the superabsorbent polymer-based granules, disquet or briquet compositions: WATERLOCK® A-140 (a)—A formulation of 25 g (25% w/w) of MARVEL® Mystery Oil or ROYCO® 481 Oil is added to 100 g of acetone in a stainless steel bowl and blended with a KITCHENAID® KSM 90 mixer (wire whip attachment; #2 speed) for ca. 5 minutes in a room maintained at ca. 83% RH and 25° C. While mixing, 75 g (75% w/w) of WATERLOCK® A-140 superabsorbent polymer powder is added to each of the petroleum oil/acetone mixtures. Mixing is continued to drive off the acetone for ca. 1-2 hr. During this mixing period, each of the petroleum oil/FINNEGAN, WATERLOCK® A-140 superabsorbent polymer compositions agglomerated into masses of granules that ranged in size from <1 to 5 mm in diameter. Formation of agglomerated granules is a function of the high humidity during the mixing process. The agglomerated granules are placed on NALGENE® sieves in a high humidity curing room maintained at ca. 80% RH and 27° C. for ca. 24 hr so the agglomerated granules would absorb moisture to assure that the superabsorbent polymer powder/lubricant complex would remain bound into distinct granules. The granular superabsorbent polymer-based compositions are then placed into a low humidity drying room maintained at ca. 27-38% RH and 25-26° C. for ca. 38 hr. Dried superabsorbent polymer-based controlled-delivery granules containing MARVEL® Mystery Oil or ROYCO® 481 Oil are stored in glass vials.

Waterlock® A-1OO, A-120, A-140, A-180, and A-200; SUPERSORB®, FAVOR® CA 100: STOCKOSORB 400 F: and AQUAKEEP J-500 (b)—A formulation of 100 g (50% w/w) of AROSURF® 66-E2 is added to 300 g of acetone in a stainless steel bowl and blended with a KITCHENAID® KSM 90 mixer (wire whip attachment; #2 speed) for ca. 5 minutes in a room maintained at ca. 27-38% RH and 25-26° C. While mixing, 100 g (50% w/w) of a WATERLOCK®, SUPERSORB®, FAVOR®, STOCKOSORB® or AQUAKEEP® superabsorbent polymer powder are slowly added into the AROSURF® 66-E2/acetone mixture. Mixing is continued until the acetone had been driven off and the powdered composition is essentially flowable (ca. 2-3 hr). Next, each 1:1 superabsorbent polymer/lubricant composition is hand-compacted in a series of plastic petri dishes (35×10 mm) to form disquets and PEEL-A-WAY® R-30 plastic tissue embedding molds (30 mm long×25 mm wide×20 mm high) to form briquets. The petri dishes and tissue embedding molds containing the compressed powdered lubricant compositions are placed in a high humidity curing room maintained at ca. 80% RH and 27° C. for ca. 72 hr to cause the compacted powdered formulation to absorb moisture and bind into single unified masses that are generally in the shape of the molds. These compositions are then placed in a low humidity drying room maintained at ca. 27-38% RH and 25-26° C. for ca. 72 hr. Dried-briquets and disquets are stored in plastic ZIPLOC® bags. The flexibility, tensile strength, and lubricant characteristics of each agglomerated formulate composition is observed to vary with the type of superabsorbent polymer that is mixed with the AROSURF® 66-E2 lubricant.

WATERLOCK® A-140 (c)—Formulations of 50 g (25% w/w) of ROYCO® 481 Oil or 25 g (25% w/w) of ROYCO® 481 Oil and 25 g (25% w/w) of graphite are added to 200 g or 100 g of acetone in stainless steel bowls, respectively, and blended with a KITCHENAID® KSM 90 mixer (wire whip attachment; #2 speed) for ca. 5 minutes in a room maintained at 27-38% RH and 25-26° C. While mixing, 150 g (75% w/w) or 50 g (50% w/w) of WATERLOCK® A-140 superabsorbent polymer are slowly added into the ROYCO® 481 Oil/Acetone or ROYCO® 481 Oil/graphite/acetone mixtures, respectively. After ca. 1 hr of mixing, ca. one-half of each semi-viscous formulation containing a flowable acetone-based formulation is poured into a series of plastic petri dishes (35×10 mm) to form disquets and PEEL-A-WAY® R-30 plastic tissue embedding molds (30 mm long×25 mm wide× 20 mm high) to form briquets. The uncompressed compositions in each mold are placed in a low humidity drying room maintained at 27-30% RH and 25-26° C. for 24 hr to allow the acetone to volatilize from the compositions. The compositions are then transferred into a high humidity curing room maintained at ca. 80% RH and 27° C. for 72 hr to assure that the superabsorbent polymer-based lubricant compositions would absorb moisture and bind into unified masses that are in the shape of the curing molds. Finally, the compositions are transferred back into the low humidity drying room (27-38% RH and 25-26° C.) to remove the entrapped water from the matrices. Dried disquet and briquet formulations are stored in plastic ZIPLOC® bags. Mixing is continued for the other half of the 2 formulations for an additional 1 hour until the acetone had volatilized from each of the powdered compositions. Each superabsorbent polymer-based lubricant composition is then hand-compacted in a series of plastic petri dishes (35×10 mm) and PEEL-A-WAY® R-30 plastic tissue embedding molds (30 mm long×25 mm wide and 20 mm high) to form disquets or briquets. The molds containing each powdered lubricant composition are placed LAW cornets into a high humidity curing room maintained at 80% RH and 27° C. for 72 hr to allow the compositions to absorb moisture and bind into unified matrices that are in the shape of the molds. These compositions are then placed into a low humidity drying room maintained at 27-38% RH and 25-26° C. for an additional 72 hr to assure that the entrapped water had been removed from the matrices. Agglomerated compositions are stored in plastic ZIPLOC® bags. Differences in the flexibility, tensile strength, and lubricant characteristics are observed between uncompacted and compacted agglomerated compositions of the two lubricant formulations.

WATERLOCK® A-140 (d)—Formulations of 20 g (10% w/w) of AROSURF® 66-E2 or CITROFLEX® A-4 and 200 g of acetone are blended in stainless steel bowls with a KITCHENAID® KSM 90 mixer (wire whip attachment; speed #2) for ca. 5 minutes in a room maintained at ca. 27-38% RH and 25-26° C. While mixing, 130 g (65% w/w) or 100 g (50% w/w) of WATERLOCK® A-140 superabsorbent polymer is slowly added to the acetone/AROSURF®66-E2 or CITROFLEX® A-4 blends and mixed for an additional 5 minutes. At this time, 50 g (25% w/w) of ROYCO® 481 Oil are added to the 130 g polymer/20 g AROSURF® or CITROFLEX®/200 g acetone formulations and mixed for ca. 1 hr. In the other formulations, 40 g (20% w/w) of ROYCO® 481 Oil are added to the 100 g polymer/20 g AROSURF® or CITROFLEX®/201 g acetone formulations and mixed for 5 minutes. Finally, 40 g (20% w/w) of graphite is added to these compositions and mixed for ca. 1 hr. The remaining procedures for formulating the uncompressed and compressed superabsorbent polymer-based lubricant compositions are as described in the preceding WATERLOCK® A-140 (c) protocol.

WATERLOCK® A-140 (e)—Formulations of 50 g (25% w/w) of AROSURF® 66-E2 or CITROFLEX® A-4 and 200 g of acetone are blended in stainless steel bowls with a KITCHENAID® KSM 90 mixer (wire whip attachment; speed #2) for ca. 5 minutes in a room maintained at 27-38% RH and 25-26° C. While mixing, 100 g (50% w/w) of WATERLOCK® A-140 superabsorbent polymer are slowly added to the acetone/AROSURF® 66-E2 or CITROFLEX® A-4 blends and mixed for an additional 5 minutes. At this time, 50 g (25% w/w) of graphite are added to the AROSURF® 66-E2 or CITROFLEX® A-4 formulations and mixed for ca. 1 hr. The remaining procedures for formulating the uncompressed and compressed superabsorbent polymer-based lubricant compositions are as described in the WATERLOCK® A-140 (c) protocol.

WATERLOCK® A-140 (f)—A formulation of 100 g (50% w/w) of graphite is added to 200 g of acetone in a stainless steel bowl and blended with a KITCHENAID® KSM 90 mixer (wire whip attachment; #2 speed) for ca. 5 minutes in a room maintained at 27-38% RH and 25-26° C. While mixing, 100 g (50% w/w) of WATERLOCK® A-140 superabsorbent polymer are slowly added to the acetone/graphite admixture and mixed for ca. 1 hour. The remaining procedures for formulating the uncompressed and compressed superabsorbent polymer-based lubricant compositions are as described in the WATERLOCK® A-140 (c) protocol.

WATERLOCK® A-140 (g)—Formulations of 80 g (40% w/w) AROSURF® 66-E2, 20 g (10% w/w) graphite or ROYCO® 481 Oil or 10 g (5% w/w) of ROYCO® 481 Oil and 10 g (5% w/w) of graphite and 200 g of acetone are added to stainless steel bowls and blended with a KITCHENAID® KSM 90 mixer (wire whip attachment; #2 speed) for ca. 5 minutes in a room maintained at 27-38% RH and 25-26° C. While mixing, 100 g (50% w/w) of WATERLOCK® A-140 superabsorbent polymer are slowly added to the graphite and/or ROYCO® 481 Oil formulations of AROSURF® 66-E2 and acetone and mixed for ca. 2 hrs to thoroughly blend the components while volatilizing the acetone. Each superabsorbent polymer-based graphite and/or ROYCO® 481 Oil powdered composition is then hand-compacted in plastic petri dishes (35×10 mm) to form disquets. The plastic petri dish compositions are placed into a high humidity curing room maintained at 80% RH and 27° C. for 72 hr to allow the superabsorbent polymer in the lubricant admixtures to absorb moisture and bind into unified matrices that are in the shape of the petri dishes. Petri dishes containing the graphite and/or ROYCO® 481 Oil compositions are then placed into a low humidity drying room (27-38% RH and 25-26° C.) for an additional 72 hr to assure that the entrapped water had evaporated from the matrices. When compared to several other AROSURF®/graphite and/or AROSURF®/ROYCO® 481 Oil disquet compositions fabricated on the protocols indicated above, it appeared that the flexibility, tensile strength, and superabsorbent polymer-based lubricant binding characteristics could be altered by varying the concentration of AROSURF® 66-E2 in the formulation. Similar findings are expected with CITROFLEX® formulations.

STOCKOSORB® 400 F(h)—A formulation of 50 g (25% w/w) graphite and 50 g (25% w/w) of ROYCO® 481 Oil is added to 200 g of acetone in a stainless steel bowl and blended with a KITCHENAID® KSM 90 mixer (wire whip attachment; #2 speed) for ca. 10 minutes in a room maintained at 27-38% RH and 25-26° C. While mixing, 100 g (50% w/w) of STOCKOSORB® 400 F superabsorbent polymer are slowly added to the acetone/graphite/ROYCO®481 Oil admixture and mixed for ca. 1 hr. The remaining procedures for formulating the uncompressed and compressed superabsorbent polymer-based lubricant compositions are as described in the WATERLOCK® A-140 (c) protocol.

STOCKOSORB® 400 F(i)—A formulation of 25 g (12.5% w/w) AROSURF® 0 66-E2 and 200 g of acetone are added to a stainless steel bowl and blended with a KITCHENAID® KSM 90 mixer (wire whip attachment; #2 speed) for ca. 5 minutes in a room maintained at 27-38% RH and 25-26° C. While mixing, 100 g (50% w/w) of STOCKOSORB® 400 F superabsorbent polymer are slowly added to the AROSURF® 66-E2/acetone blend and mixed for an additional 5 minutes. At this time, 25 g (12.5% w/w) ROYCO® 481 Oil are added to the formulation while mixing is continued for an additional 5 minutes. Finally, 50 g (25% w/w) of graphite are added to the admixture while mixing is continued for ca. 1 hr. The remaining procedures for formulating the uncompressed and compressed superabsorbent polymer based lubricant compositions are as described in the WATERLOCK® A-140 (c) protocol.

Example 3

A series of aqueous semiviscous to viscous superabsorbent polymer-based lubricant compositions are formulated using admixing procedures. The procedures utilized several types of superabsorbent polymer powders or fine granules that ranged in size from ca. <0.5 to 300 microns. Liquid lubricants utilized as examples in the formulations are the petroleum oils MARVEL® Mystery Oil, and/or ROYCO® 481 Oil, the non-petroleum oil AROSURF® 66-E2, and/or water. Graphite (ca.-325 mesh) and/or carbon (ca.-325 mesh) are utilized as examples of solid lubricants in the aqueous superabsorbent polymer formulations or combined with one or more petroleum and/or non-petroleum liquid lubricants to form aqueous multicomponent lubricant formulations. Formulation or lubricant additives such as polymer or non-polymer emulsifiers, dispersants, plasticizers, surfactants, suspending agents, viscosity modifying agents, and the like, could be optionally added to the aqueous compositions to enhance the overall characteristics of one or more solid and/or liquid lubricants. Superabsorbent polymers used as matrices in the liquid compositions are FAVOR® CA 100 (crosslinked potassium polyacrylate/polyacrylamide copolymer), STOCKOSORB® 400 F (crosslinked potassium polyacrylate/polyacrylamide terpolymer), SANWET® IM-1500 F (starch grafted sodium polyacrylate), ARIDALL® 1125 F (potassium polyacrylate, lightly crosslinked), DOW® XU 40346.00 (partial sodium salt of crosslinked polypropenoic acid), WATERLOCK® A-180 (starch-g-poly(2-propenamide-co-2-propenoic acid, sodium salt), WATERLOCK® B-204 (starch-g-poly(2-propenamide-co-2-propenoic acid, potassium salt), AQUASORB®/AQUASTORE® F (copolymer of acrylamide and sodium acrylate), SUPERSORB® (starch acrylonitrile copolymer), ALCOSORB® AB3F (crosslinked polyacrylamide copolymer), and AQUAKEEP® J-550 (acrylic acid, polymers, sodium salt). A commercial formulation of acrylamide-acrylic acid sodium salt copolymer emulsion in hydrocarbon oil (AQUASORB® EM-533; SNF Floeger, France) is also used as a superabsorbent polymer-based liquid lubricant.

Water-based liquid and/or solid lubricants are vigorously mixed with one or more superabsorbent polymers to form a variety of variable-viscosity gels, semi-gels, creams or grease-like compositions whose physicochemical characteristics are dependent on the type and concentration of superabsorbent polymer(s), the type and concentration of lubricant(s), the water quality and concentration of water utilized to activate the swelling/gelling of the superabsorbent polymer(s), the type and concentration of formulation/lubricant additives, the order of component mixing, and the shear strength utilized to mix the components. Optimal performance of these water-based superabsorbent polymer-lubricant compositions would be expected in a closed or sealed system. This would allow the variable-viscosity composition to retain the original swelling capacity or hydrogel consistency of the superabsorbent polymer(s) due to little or no evaporation of water that is bound within the superabsorbent polymer matrix, and therefore, maintain consistent lubricating characteristics. However, when used in an open system, evaporation of the water from the aqueous superabsorbent polymer-based lubricant compositions would cause the superabsorbent polymer to shrink and lose its hydrogel and viscosity characteristics, thereby requiring the addition of water to reform the composition to a consistency that is similar to that observed in the original composition.

In other formulations, liquid and/or solid lubricants could be admixed with the superabsorbent polymer(s) into an initial nonaqueous composition. Various concentrations of water could be added to these formulations in a final step to activate the lubricant composition to form gels, semi-gels, creams, and the like, of various viscosities in the environment of use (e.g., in a closed system via a fitting).

The following admixing protocols are utilized to formulate the variable-viscosity superabsorbent polymer-based lubricant compositions.

FAVOR®CA 100, STOCKOSORB® 400F, SANWET® IM-1500F, ARIDALL® 1125F, DOW® XU 40346.00, WATERLOCK® A-180, WATERLOCK® B-204, AQUASORB®/AQUASTORE® F, SUPERSORB®, ALCOSORB® AB3F, and AQUAKEEP® J-550 (a))—Formulations of 49.95 g (99.9% w/w), 49.9 g (99.8% w/w), 49.875 g (99.75%), 49.65 g (99.7% w/w), 49.8 g (99.6% w/w), 49.775 g (99.55% w/w), or 99.65 g (99.3% w/w) of distilled water (i.e., acting as lubricant) and 0.1 g (0.2% w/w), 0.125 g (0.25% w/w), 0.15 g (0.3% w/w), 0.2 g (0.4% w/w), 0.225 g (0.45% w/w), 0.25 g (0.5% w/w), or 0.35 g (0.7% w/w) of each of the superabsorbent polymers are vigorously hand-shaken in 60 ml glass prescription bottles. The bottles are then thoroughly mixed on a STROKEMASTER® paint shaker for ca. 5 minutes to form a variety of slightly viscous to highly viscous hydrogel lubricant formulations. Formulation characteristics (e.g., viscosity and pourability) are observed to vary with the type and concentration of superabsorbent polymer utilized in the distilled water formulations.

FAVOR®CA 100, STOCKOSORB® 400F, SANWET® IM-1500F, ARIDALL® 1125F, DOW® XU 40346.00, WATERLOCK® A-180, WATERLOCK® B-204, AQUASORB®/AQUASTORE® F, SUPERSORB®, ALCOSORB® ABF, and AQUAKEEP® J-550 (b))—Formulations of 3 g (10% w/w) graphite or carbon, or 1.5 g (5% w/w) of graphite and 1.5 g (5% w/w) of carbon and 26.94 g (89.8% w/w) or 26.91 g (89.7%) of distilled water are admixed with a spatula in hinged-lid polyethylene containers (35×45 mm diameter; 50 mil capacity) for ca. one minute. Then 0.06 g (0.2% w/w) or 0.09 g (0.3% w/w) of each superabsorbent polymer is added to each graphite, carbon, or carbon/graphite formulation and mixed with a spatula for ca. 2 minutes. PARAFILM® M is placed over the containers before the snap-lid is closed and the containers containing the 0.2% or 0.3% superabsorbent polymers in the lubricant formulation are mixed on a STROKEMASTER® paint shaker for 10 minutes or 15 minutes, respectively. Containers of the variable-viscosity lubricant compositions are stored in ZIPLOC® bags. Formulation characteristics (e.g., viscosity) are observed to vary with the type and/or concentration of lubricant(s) utilized in the compositions.

FAVOR®CA 100, STOCKOSORB® 400F, SANWET® IM-1500F, ARIDALL® 1125F, DOW® XU 40346.00, WATERLOCK® A-180, WATERLOCK® B-204, AQUASORB®/AQUASTORE®F, SUPERSORB®, ALCOSORB® AB3F, and AQUAKEEP® J-550 (c) —Formulations of 1.5 g (5% w/w) of ROYCO® 481 Oil and 28.47 g (94.9% w/w), 28.41 g (94.7% w/w), 28.35 g (94.5% w/w), 28.29 (94.3% w/w), and 28.20 g (94% w/w) distilled water are added to hinged-lid polyethylene containers (35×45 mm diameter; 50 ml capacity) and mixed on a STROKEMASTER® paint shaker for ca. 10 minutes. Then, 0.03 g (0.1% w/w), 0.09 g (0.3% w/w), 0.15 g (0.5% w/w), 0.21 g (0.7% w/w), and 0.3 g (1% w/w) of each superabsorbent polymer is added to each respective container and vigorously hand-shaken for ca. 1-2 minutes. To assure thorough mixing, the containers with the 0.1%, 0.3%, 0.5%, 0.7% and 1% superabsorbent polymer-based lubricant compositions are placed on the paint shaker for ca, 5, 10, 15, 20, and 25 minutes, respectively. PARAFILM® M is placed over the containers before the snaplids are closed to assure that the lids are tightly sealed before mixing on the paint shaker. Containers of the variable-viscosity lubricant compositions are stored in ZIPLOC® bags. Formulation characteristics (e.g., viscosity) are observed to vary with the type and/or concentration of superabsorbent polymer and type and/or concentration of lubricant utilized in the compositions.

FAVOR®CA 100, STOCKOSORB® 400F, SANWET® IM-1500F, ARIDALL® 1125F, DOW® XU 40346.00, WATERLOCK® A-180, WATERLOCK® B-204, AQUASORB®/AQUASTORE®F, SUPERSORB®, ALCOSORB® AB3F, and AQUAKEEP® J-550 (d))—Formulations of 1.5 g (5% w/w) of ROYCO® 481 Oil and 1.5 g (5% w/w) of graphite or carbon and 0.75 g (2.5% w/w) of graphite and 0.75 g (2.5% ww) of carbon and 26.97 g (89.9% w/w), 26.91 g (89.7% w/w), 26.85 g (89.5% w/w), 26.79 g (89.3% w/w), or 26.7% (89% w/w) distilled water are added to hinged-lid polyethylene containers (35×45 mm diameter; 50 ml capacity) and mixed on a STROKEMASTER® paint shaker for ca. 10 minutes. Then 0.03 g (0.1% w/w), 0.09 g (0.3% w/w), 0.15 g (0.5% w/w), 0.21 g (0.7% w/w) and 0.3 g (1% w/w) of each superabsorbent polymer is added to each respective container and vigorously hand-shaken for ca. 1-2 minutes. To assure thorough mixing, the containers with the 0.1%, 0.3%, 0.5% 0.7%, and 1% superabsorbent polymer-based lubricant compositions are placed on the paint shaker for ca. 5, 10, 15, 20 and 25 minutes, respectively. PARA-FILM® M is placed over the containers before the snap-lids are closed to assure that the lids are tightly sealed before mixing on the paint shaker. Containers of the variable-viscosity lubricant compositions are stored in ZIPLOC® bags. Formulation characteristics (e.g., viscosity) are observed to vary with the type and/or concentration of superabsorbent polymer and the type and/or concentration of lubricant(s) utilized in the compositions.

AQUASORB® EM-533R—Formulations of 0.9 g (3% w/w), 1.5 g (5% w/w), 2.1 g (7% w/w) or 3 g (10% w/w) of a superabsorbent polymer/hydrocarbon oil/surfactant blend as supplied by the manufacturer are added to 29.1 g (97% w/w), 28.5 g (95% w/w), 27.9 g (93% w/w) or 27 g (90% w/w) of distilled water, respectively, in snap-lid polyethylene containers (35×45 mm diameter; 50 ml capacity) and vigorously shaken by hand for ca. one minute. PARAFILM® M or aluminum foil is placed over the containers before the snap-lids are sealed to assure that the containers would not leak before placing them on STROKEMASTER® paint shaker for ca. 10 minutes to be thoroughly mixed. The variable-viscosity lubricant compositions are stored in ZIPLOC® bags. Formulation characteristics (e.g., viscosity) varied with the concentration of AQUASORB® EM-533R in each composition.

It should be noted that the addition of formulation additives such as hydrophilic polymers (e.g., PEMULEN® TR-1/TR-2), silicas (e.g., WESSLON® 50, SUPERNAT® 22), and the like, are shown to improve the component compatibility in several of the admixtures indicated in this example as well as some of the other examples. The affect of silicas on the friction reducing and wear properties of the lubricant composition would, however, have to be evaluated in each application to determine its acceptability in the formulation.

Example 4

The comparative friction-reducing efficacy of several solid (i.e., granules or disquets) and superabsorbent polymer-based lubricant compositions indicated in Examples 1-2 is evaluated in a series of laboratory tests using a lubricant testing device and methods that are modified from ASTM test standards such as B461 and B526. ASM Handbook, Vol. 18, Friction, Lubrication, and Wear Technology, ASM International, 1992, 942 pp.). Non-superabsorbent polymer compositions composed of one or more lubricants and any lubricant additives are utilized as standards. A control consisted of a test with no superabsorbent polymer or lubricant(s), i.e., metal to metal.

In general, a 30×18×24 inch device consisted of a 7½ inch steel tension arm or bar containing a 2¼ inch diameter aluminum impact/pressure plate or disc that, when lowered, contacted the solid lubricant composition (e.g., disquet) that is placed flat on a 2¾ inch aluminum cup-like sample-holding plate that is attached to the end of the shaft of a motor (Dayton model 6K255C, ¾ HP, 3450 RPM, 115 Volts, 10.8 AMPS, 60 HZ, 1 Phase, ⅝ inch diameter shaft; Dayton Electric Manufacturing Company, Chicago, Ill.). A 21 inch torque wrench (TEC 250, Snap-On Tools Corporation, Kenosha, Wis.) is attached by a bolt to the 7½ inch tension bar to measure the foot-pounds (ft-lbs) of force applied by hand to a superabsorbent polymer-based lubricant composition. The maximum foot-pounds that could be hand-applied to a superabsorbent polymer-based lubricant composition is ca. 271 ft-lbs (i.e., a 200 ft-lb reading on the torque wrench is equivalent to a calculated value of 271-ft-lbs based on the length of the tension bar and torque wrench).

Short, intermittent, and extended-term stress tests (Table 1) are conducted in an open system to determine the comparative effectiveness of selected superabsorbent polymer-based lubricant compositions in preventing or reducing the adverse effects of friction generated at high torque and high RPM (e.g., high temperature and shear at 271 ft-lbs of force at 3450 RPM) for various time periods or intervals. The observed effects of the stresses applied to a solid lubricant composition or matrix by the testing device are recorded for each test series (e.g., brittleness, elasticity, temperature effects, controlled release potential). The tests are designed to evaluate the controlled release characteristics and effectiveness of the solid superabsorbent polymer-based lubricant compositions as well as the tensile strength and integrity of the superabsorbent polymer-based matrices following various periods and levels of friction-generated compression-decompression and shear.

One series of short-term tests is conducted to determine if 271 ft-lbs of force applied with the tension bar pressure disk or plate to selected solid controlled delivery superabsorbent polymer-based lubricant compositions that are placed in a sample-holding cup that is spinning at 3450 RPM would release or deposit enough lubricant from the compressed matrix to prevent the motor shaft/sample cup from spinning. The duration of each test is ca. 5 seconds. Several solid superabsorbent polymer-based compositions (e.g., disquets) that reached 271 ft-lbs without shredding or cracking are re-tested at 271 ft-lbs in a consecutive series of 5 second start-stop intermittent-term tests up to a maximum of 15 times to determine if a sufficient amount of lubricant(s) would be released or sheared from a unified superabsorbent polymer-based matrix that is subjected to brief periods of repeated severe stresses from high compression, friction, and decompression. A test is terminated if the motor is stopped before reaching 271 ft-lbs, and the number of effective 271 ft-lb lubricating periods is recorded. It should be noted that the sample cup and pressure plate are cleaned between each sub-test in a test series. A third series of extended-term stress tests are also conducted at ca. 271 or 135 ft-lbs of force (i.e., a 100 ft-lb reading on the torque wrench is equivalent to a calculated value of 136 ft-lbs based on the length of the tension bar and torque wrench). In this series, 136 or 271 ft-lbs of force at 3450 RPM is continually applied to several agglomerated superabsorbent polymer-based lubricant compositions (e.g., disquets or granules) for a 15-minute period to determine the lubricating efficacy and structural integrity of the solid compositions. Tests are terminated at 15 minutes or if the motor is stopped before the 15 minute test period is completed, and the duration of effectiveness and condition of the matrix are recorded.

Tests are conducted in a room maintained at ca. 68-79% RH and 21-23° C. Superabsorbent polymer-based lubricant compositions are stored in this room in double-bagged ziplock pouches prior to testing.

In general, laboratory test results (Table 1) indicated that superabsorbent polymers could be formulated with one or more conventional solid and/or liquid lubricants and agglomerated into solid matrices such as disquets to provide prolonged lubrication under high stress conditions. Fabrication procedures e.g. mixing and agglomeration are shown to be critical to the controlled release characteristics of the superabsorbent polymer matrices and to prolonged lubrication performance. The type, number, and concentration of superabsorbent polymers, lubricants, lubricant additives, and the order of component mixing and compression strength directly affect the controlled release characteristics of formulated superabsorbent polymer matrices.

Example 5

The comparative friction-reducing efficacy of several variable-viscosity superabsorbent polymer water-based lubricant compositions indicated in Example 3 is evaluated in a series of laboratory tests using a lubricant testing device and methods that are modified from an ASTM test standard such as D2714 (ASTM Handbook, Vol. 18, Friction, Lubrication, and Wear Technology, ASTM International, 1992, 942 pp.). Non-superabsorbent polymer compositions composed of one or more lubricants and any lubricant additives are utilized as standards. A control consisted of a test with no superabsorbent polymer or lubricant(s), i.e., metal to metal.

In general, a 24×30×18 inch device consisting of a 7½ inch steel tension arm or bar containing a 1 inch wide×½ inch deep impact/pressure semicircular notch in the based of the bar that, when lowered, contacted a 1 inch sample-holding collar surrounding a ⅝ inch diameter shaft of a motor (Dayton model 6K255C, ¾ HP, 3450 RPM, 115 volts, 10.8 AMPS, 60 HZ, 1 Phase, ⅝ inch diameter shaft; Dayton Electric Manufacturing Company, Chicago, Ill.). A 21 inch torque wrench (TEC 250, Snap-On Tools Corporation, Kenosha, Wis.) is attached by a bolt to the 7½ inch tension bar to measure the foot-pounds (ft-lbs) of force applied by hand to a superabsorbent polymer-based lubricant composition. The maximum foot-pounds that could be hand applied to a superabsorbent polymer-based lubricant composition is 271 ft-lbs (i.e., a 200 ft-lb reading on the torque wrench is equivalent to a calculated value of 271 ft-lbs band on the length of the tension bar and torque wrench).

A series of short-term stress tests (Table 2) are conducted in an open system to determine the comparative effectiveness of selected superabsorbent polymer water-based lubricant compositions in preventing or reducing the adverse effects of friction generated at high torque and high RPM (e.g., the lubrication efficacy at 271 ft-lbs of force at 3450 RPM). The tests are designed to evaluate the efficacy of the variable-viscosity water-based superabsorbent polymer lubricant compositions following a brief period of high compression (i.e., 271 ft-lbs) and high friction (i.e., at 3450 RPM).

The tests are conducted to determine if 271 ft-lbs of force could be applied to 0.15 g water-based superabsorbent polymer lubricant compositions placed on the motor shaft collar that is activated to spin at 3450 RPM, without stopping the motor. The duration of each test is ca. 5 seconds. A test with a formulation is terminated if the motor is stopped before reaching 271 ft-lbs, and the ft-lbs achieved is recorded.

Tests are conducted in a room maintained at ca. 68-79% RH and 21-23° C. Water-based superabsorbent polymer lubricant compositions are stored in this room in double-bagged zip-lock pouches prior to testing.

In general, laboratory test results (Table 2) indicated that superabsorbent polymers could be formulated with water and one or more lubricants into a variety of variable-viscosity hydrogel compositions that would effectively lubricate the open test system in short-term evaluations. Tests with standards such as ROYCO® 482 Oil, MARVEL® Mystery Oil, carbon and graphite, graphite, carbon, water, and carbon, graphite, and water stopped the motor before reaching 271 ft-lbs of torque (i.e., 81-231 ft-lbs). A metal to metal control is observed to stop the motor at 34 ft-lbs of torque.

It will be apparent to those skilled in the art that various modifications and variations can be made to the lubricant composition of the present invention comprising a superabsorbent polymer in combination with a material for decreasing friction between moving surfaces as well as the method for lubricating a surface employing such a composition without departing from the spirit or scope of the invention. It is intended that these modifications and variations of this invention are to be included as part of the invention, provided they come within the scope of the appended claims and their equivalents.

TABLE 1

Evaluation of Agglomerated Superabsorbent Polymer-Based Solid Lubricant Compositions: Short, Intermittent, and Extended-Term Stream Tests

| Composition formulation | Composition type; size (diameter × thickness); weight (g) | Maximum torque (ft-lbs) applied to composition at 3450 RPM | Stopped motor (Yes, No) | Composition appearance; structural integrity satisfactory (+)/unsatisfactory (−)* |
|---|---|---|---|---|
| Short-Term Tests | | | | |
| WaterLock ® A-140 (65% w/w) + Citroflex A-4 (10% w/w) + Royco ® 481 Oil (25% w/w) | Disquet; 35 × 10 mm; 9.04 | 271 | No | Matrix Flat; + |
| WaterLock ® A-140 (65% w/w) + Arosurf ® 66-E2 (10% w/w) + Royco ® 481 Oil (25% w/w) | Disquet; 35 × 9 mm; 9.04 | 271 | No | Matrix Flat; + |
| WaterLock ® A-140 (50% w/w) + Graphite (25% w/w) + Royco ® 481 Oil (25% w/w) | Disquet; 34 × 10 mm; 8.91 | 271 | No | Matrix Flat; + |
| WaterLock ® A-140 (50% w/w) + Graphite (5% w/w) + Arosurf ® 66-E2 (40% w/w) + Royco ® 481 Oil (5% w/w) | Disquet; 34 × 9 mm; 9.12 | 271 | No | Matrix Flat; + |
| WaterLock ® A-140 (50% w/w) + Arosurf ® 66-E2 (40% w/w) + Royco ® 481 Oil (10% w/w) | Disquet; 35 × 9 mm; 8.97 | 271 | No | Matrix Flat; + |

TABLE 1-continued

Evaluation of Agglomerated Superabsorbent Polymer-Based Solid Lubricant Compositions: Short, Intermittent, and Extended-Term Stream Tests

| Composition formulation | Composition type; size (diameter × thickness); weight (g) | Maximum torque (ft-lbs) applied to composition at 3450 RPM | Stopped motor (Yes, No) | Composition appearance; structural integrity satisfactory (+)/unsatisfactory (−)* |
|---|---|---|---|---|
| WaterLock ® A-140 (50% w/w) + Arosurf ® 66-E2 (40% w/w) + Graphite (10% w/w) | Disquet; 35 × 9 mm 9.04 | 271 | No | Matrix Flat; + |
| WaterLock ® A-140 (50% w/w) + Graphite (20% w/w) + Arosurf ® 66-E2 (10% w/w) + Royco ® 481 Oil (20% w/w) | Disquet; 35 × 9 mm; 9.15 | 271 | No | Matrix Flat; + |
| WaterLock ® A-140 (50% w/w) + Citroflex ® A-4 (10% w/w) + Graphite (20% w/w) + Royco ® 481 Oil (20% w/w) | Disquet; 35 × 10 mm; 9.12 | 271 | No | Matrix Flat; + |
| WaterLock ® A-100 (50% w/w) + Arosurf ® 66-E2 (50% w/w) | Disquet; 32 × 8 mm; 5.89 | 271 | No | Matrix Flat; + |
| WaterLock ® A-120 (50% w/w) + Arosurf ® 66-E2 (50% w/w) | Disquet; 32 × 8 mm; 5.88 | 271 | No | Matrix Flat; + |
| WaterLock ® A-140 (75% w/w) + Royco ® 481 Oil (25% w/w) | Granules; 6.6 + 6.9 mm; 9.13 | 271 | No | Matrices Flat; + |
| WaterLock ® A-140 (50% w/w) + Marvel ® Mystery Oil (50% w/w) | Granules; 2.5 × 2.8 mm; 9.06 | 271 | No | Matrices Flat; + |
| Intermittent-Term Tests | | | | |
| WaterLock ® A-140 (50% w/w) + Arosurf ® 66-E2 (40% w/w) + Graphite ® (50% w/w) + Royco ® 481 Oil (5% w/w) | Disquet; 33 × 8 mm; 9.12 | 271 | No | Matrix Flat; + |
| WaterLock ® A-140 (50% w/w) + Arosurf ® 66-E2 (10% w/w) + Royco ® 481 Oil (25% w/w) | Disquet; 35 × 10 mm; 9.12 | 271 | No | Matrix Flat; + |
| WaterLock ® A-140 (65% w/w) + Arosurf ® 66-E2 (10% w/w) + Royco ® 481 Oil (25% w/w) | Disquet; 35 × 10 mm; 9.04 | 271 | No | Matrix Flat; + |
| WaterLock ® A-140 (50% w/w) + Graphite (25% w/w) + Arosurf ® 66-E2 (25% w/w) | Disquet; 35 × 9 mm; 8.91 | 271 | No | Matrix Flat; + |
| WaterLock ® A-140 (65% w/w) + Citroflex ® A-4 (10% w/w) + Royco ® 481 Oil (25% w/w) | Disquet; 35 × 9 mm; 9.08 | 271 | No | Matrix Flat; + |
| WaterLock ® A-140 (50% w/w) + Graphite (25% w/w) + Royco ® 481 Oil (25% w/w) | Disquet; 35 × 10 mm; 8.94 | 271 | No | Matrix Flat; + |
| WaterLock ® A-100 (50% w/w) + Arosurf ® 66-E2 (50% w/w) | Disquet; 32 × 8 mm; 5.89 | 271 | No | Matrix Flat; + |
| WaterLock ® A-120 (50% w/w) + Arosurf ® 66-E2 (50% w/w) | Disquet; 32 × 8 mm; 5.88 | 271 | No | Matrix Flat; + |
| Extended-Term Tests | | | | |
| WaterLock ® A-140 (65% w/w) + Citroflex ® A-4 (10% w/w) + Royco ® 481 Oil (25% w/w) | Disquet; 35 × 8 mm; 9.07 | 136 | No | Matrix Flat; + |
| WaterLock ® A-140 (65% w/w) + Arosurf ® 66-E2 (10% w/w) + Royco ® 481 Oil (25% w/w) | Disquet; 35 × 8 mm; 9.18 | 136 | No | Matrix Flat; + |
| WaterLock ® A-140 (50% w/w) + Graphite 25% w/w) + Royco ® 481 Oil (25% w/w) | Disquet; 35 × 10 mm; 8.99 | 136 | No | Matrix Flat; + |
| WaterLock ® A-140 (50% w/w) + Arosurf ® 66-E2 (10% w/w) + Graphite (20% w/w) + Royco ® 481 Oil (20% w/w) | Disquet; 35 × 10 mm; 8.82 | 136 | No | Matrix Flat; + |
| WaterLock ® A-140 (50% w/w) + Citroflex ® A-4 (10% w/w) + Graphite A-4 (20% w/w) + Royco ® 481 Oil (20% w/w) | Disquet; 34 × 10 mm; 9.01 | 136 | No | Matrix Flat; + |
| WaterLock ® A-140 (50% w/w) + Graphite (25% w/w) + Arosurf ® 66-E2 (25% w/w) | Disquet; 35 × 9 mm; 9.16 | 136 | No | Matrix Flat, + |
| WaterLock ® A-120 (50% w/w) + Arosurf ® 66-E2 (50% w/w) | Disquet; 33 × 8 mm; 5.99 | 136 | No | Matrix Flat; + |
| WaterLock ® A-100 (50% w/w) + Arosurf ® 66-E2 (50% w/w) | Disquet; 32 + 8 mm; 5.89 | 136 | No | Matrix Flat; + |

TABLE 1-continued

Evaluation of Agglomerated Superabsorbent Polymer-Based Solid Lubricant Compositions: Short, Intermittent, and Extended-Term Stream Tests

| Composition formulation | Composition type; size (diameter × thickness); weight (g) | Maximum torque (ft-lbs) applied to composition at 3450 RPM | Stopped motor (Yes, No) | Composition appearance; structural integrity satisfactory (+)/unsatisfactory (−)* |
|---|---|---|---|---|
| WaterLock ® A-140 (50% w/w) + Arosurf ® 66-E2 (50% w/w) | Disquet; 35 + 8 mm; 6.03 | 271 | No | Matrix Flat; + |

*Replications within a test series indicated that the agglomerated superabsorbent polymer-base lubricant compositions would prematurely stop the motor and/or show excessive uneven wear, scorching, cracking, shredding, and the like from the high levels of friction that are generated at high torque when the surface characteristics of the matrices in contact with the spinning sample-holding cup and tension plate are not smooth and even. Tests with several nonsuperabsorbent polymer-base lubricant compositions or standards (e.g., 10% w/w Royco ® 481 Oil + 80% w/w Arosurf ® 66-E2 + 10% w/w Graphite applied at 4.5 g) showed only short-term efficacy that is comparable to the superabsorbent polymer-base lubricant compositions. However, no effectiveness is observed with any nonsuperabsorbent polymer composition in ntermittent or extended-term tests (i.e., the motor is rapidly stopped). A no sample metal control is observed to stop the motor at 27 ft-lbs of torque.

TABLE 2

Evaluation of Variable-Viscosity Water-Based Superabsorbent Polymer-Based Solid Lubricant Compositions; Short-Term Tests

| Composition formulation | Viscosity characteristics; weight (g) | Maximum torque (ft-lbs) applied to composition at 3450 RPM | Stopped motor (Yes, No) |
|---|---|---|---|
| Water (89.7% w/w) + Carbon (5% w/w) + Graphite (5% w/w) + Alcosorb ® AB3F (0.3% w/w) | Viscous; 0.15 | 271 | No |
| Water (89.8% w/w) + Carbon (5% w/w) + Graphite (5% w/w) + Favor ® CA 100 (0.2% w/w) | Viscous; 0.15 | 271 | No |
| Water (89.8% w/w) + Carbon (5% w/w) + Graphite (5% w/w) + Sanwet ® IM-1500F (0.2% W/W) | Viscous; 0.15 | 271 | No |
| Water (89.7% w/w) + Carbon (10% w/w) + Aridall ® 1125F (0.3% w/w) | Semiviscous; 0.15 | 271 | No |
| Water (89.7% w/w) + Carbon (10% w/w) + Aquasorb ®/Aquastore ®F (0.3% w/w) | Viscous; 0.15 | 271 | No |
| Water (89.7% w/w) + Carbon (10% w/w) + Sanwet ® IM-1500F (0.3% w/w) | Viscous; 0.15 | 271 | No |
| Water (89.7% w/w) + Carbon (10% w/w) + SuperSorb ™ (0.3%) | Semiviscous; 0.15 | 271 | No |
| Water (89.1% w/w) + Graphite (10% w/w) + DOW XU 40346.00 (0.3% w/w) | Semiviscous; 0.15 | 271 | No |
| Water (89.7% w/w) + Graphite (10% w/w) + Stockosorb ® 400F (0.3% w/w) | Semiviscous; 0.15 | 271 | No |
| Water (89.7% w/w) + Graphite (10% w/w) + Alcosorb ® AB3F (0.3% w/w) | Highly Viscous; 0.15 | 211 | No |
| Water (89.7% w/w) + Graphite (10% w/w + Favor ® CA 100 (0.3% w/w) | Highly Viscous; 0.15 | 271 | No |
| Water (89.7% w/w) + Graphite (10% w/w) + WaterLock ® A-180 (0.3% w/w) | Semiviscous; 0.15 | 271 | No |

*Standards and control are observed to stop the motor before reaching the effective maximum torque of 271 ft-lbs.

What is claimed is:

1. A process for manufacturing a lubricant composition comprising a polymer where said polymer comprises a superabsorbent polymer that absorbs more than about 100 times its weight in water, by combining said polymer with a material for lubricating a surface wherein said material for lubricating a surface comprises:

(1) a lubricating metal and alloys thereof, a lubricating metal chalcogen compound, halide, carbonate, silicate or phosphate, or a particulate lubricating metal nitride, or a carbon lubricant; or (2) a silicate ester, polyphenyl ether, organic phosphate, chlorinated biphenyl, phenanthrene or phthalocyanine compound;

(3) said material for lubricating a surface optionally containing a lubricant comprising an, organic lubricant, inorganic lubricant, or lubricant additive;
(4) or mixtures thereof.

2. A lubricant composition of matter comprising a product produced by the process of claim 1.

3. The lubricant product of claim 2 wherein said organic lubricant comprises a petroleum oil lubricant or grease thereof, a fatty oil, fatty acid, wax, synthetic oil lubricant or grease thereof, two-mol ethoxylate of isostearyl alcohol, a soap, a polymerized olefin, or an organic ester and wherein said composition optionally comprises a lubricant additive, or mixtures thereof.

4. A lubricant composition of matter comprising a product produced by the process comprising forming a mixture comprising a polymer where said polymer comprises a superabsorbent polymer, said mixture further comprising a material for lubricating a surface, wherein said superabsorbent polymer absorbs more than about 100 times its weight in water and wherein said material for lubricating a surface comprises a solid lubricant comprising a metal alloy, an inorganic chalcogen compound, halide, nitride, carbonate, phosphate compound, carbon lubricant, or metal material that provides barrier-layer lubrication, or mixtures thereof, and wherein said composition optionally comprises a lubricant additive.

5. The lubricant composition of claim 4, wherein said material for lubricating a surface comprises, molybdenum disulfide, cobalt chloride, antimony oxide, niobium selenide, tungsten disulfide, boron nitride, silver sulfate, cadmium chloride, cadmium iodide, cadmium oxide, borax, basic white lead, lead carbonate, lead monoxide, lead iodide, asbestos, talc, mica, zinc oxide, zinc phosphate, iron phosphate, manganese phosphate, carbon, graphite, babbitt, bronze, brass, aluminum, gallium, indium, thallium, thorium, copper, silver, gold, mercury, lead, tin, indium, or the Group VIII noble metals or mixtures thereof.

6. The lubricant composition of claim 2 wherein said organic lubricant comprises a solid organic lubricant.

7. The lubricant composition of claim 6, wherein said solid organic lubricant comprises a fluoroalkylene homopolymer or copolymer, a lower alkylene polyolefin homopolymer or co-polymer, a paraffinic hydrocarbon wax, phenanthrene, copper phthalocyanine, or mixtures thereof.

8. A lubricant composition of matter comprising a product produced by the process comprising forming a mixture comprising a polymer where said polymer comprises a superabsorbent polymer, wherein said superabsorbent polymer comprises a polymer of acrylic acid, an acrylic ester, acrylonitrile, acrylamide, co-polymers thereof or mixtures thereof, said mixture further comprising a material for lubricating a surface, wherein said superabsorbent polymer absorbs more than about 100 times its weight in water, and wherein said material for lubricating a surface comprises water containing a lubricant additive.

9. A lubricant composition of matter comprising a product produced by the process comprising forming a mixture comprising a superabsorbent polymer, wherein said superabsorbent polymer comprises a polymer of acrylic acid, an acrylic ester, acrylonitrile, acrylamide, co-polymers thereof or mixtures thereof, said mixture further comprising a material for lubricating a surface, wherein said superabsorbent polymer absorbs more than about 100 times its weight in water, and wherein said material for lubricating a surface comprises an oil or greases thereof and water, and wherein said composition optionally comprises a lubricant additive.

10. A lubricant composition of matter comprising a product produced by the process comprising forming a mixture comprising a polymer where said polymer comprises a superabsorbent polymer, wherein said superabsorbent polymer comprises a polymer of acrylic acid, an acrylic ester, acrylonitrile, acrylamide, co-polymers thereof or mixtures thereof, said mixture further comprising a material for lubricating a surface, wherein said superabsorbent polymer absorbs more than about 100 times its weight in water, wherein said material for lubricating a surface comprises a solid lubricant and water, and wherein said composition optionally comprises a lubricant additive.

11. The lubricant composition of claim 10, wherein said solid lubricant comprises molybdenum disulfide, cobalt chloride, antimony oxide, niobium selenide, tungsten disulfide, boron nitride, silver sulfate, cadmium chloride, cadmium iodide, cadmium oxide, borax, basic white lead, lead carbonate, lead monoxide, lead iodide, asbestos, talc, mica, zinc oxide, zinc phosphate, iron phosphate, manganese phosphate, carbon, graphite, babbitt, bronze, brass, aluminum, gallium, indium, thallium, thorium, copper, silver, gold, mercury, lead, tin, indium, the Group VIII noble metals, a fluoroalkylene homopolymer or copolymer, a lower alkylene polyolefin homopolymer or co-polymer, a paraffinic hydrocarbon wax, phenanthrene, copper phthalocyanine, or mixtures thereof.

12. A lubricant composition of matter comprising a product produced by the process comprising forming a mixture comprising a polymer where said polymer comprises a superabsorbent polymer, said mixture further comprising a material for lubricating a surface, wherein said superabsorbent polymer absorbs more than about 100 times its weight in water, wherein said material for lubricating a surface comprises a phosphate, and wherein said composition optionally comprises a lubricant additive.

13. The lubricant composition of claim 12, wherein said material for lubricating a surface comprises tricresyl phosphate, zinc phosphate, iron phosphate or manganese phosphate, or mixtures thereof.

14. The lubricant composition of claim 2 wherein said organic lubricant comprises a fatty oil, fatty acid, or wax, or mixtures thereof, and wherein said composition optionally comprises a lubricant additive.

15. The lubricant composition of claim 2 wherein said organic lubricant comprises a synthetic oil lubricant, or grease thereof, and wherein said composition optionally comprises a lubricant additive.

16. The lubricant composition of claim 2 wherein said organic lubricant comprises a soap, and wherein said composition optionally comprises a lubricant additive.

17. The composition of any one of claims 1-7, and 12-16 wherein said composition is substantially anhydrous.

18. The composition of any one of claims 1-7, and 12-16 wherein said superabsorbent polymer comprises a polymer of acrylic acid, an acrylic ester, acrylonitrile, acrylamide, co-polymers thereof or mixtures thereof.

19. The composition of any one of claims 3-16 wherein said lubricant additive comprises an antioxidant, rust inhibitor, antiwear compound, extreme pressure additive, detergent, dispersant, pour point depressant, viscosity-index improver, or foam inhibitor, or mixtures thereof.

20. The composition of claim 3 wherein said organic lubricant comprises a petroleum oil lubricant or grease thereof.

21. The composition of claim 3 wherein said organic lubricant comprises a fatty oil.

22. The composition of claim 3 wherein said organic lubricant comprises a fatty acid.

23. The composition of claim 3 wherein said organic lubricant comprises a wax.

24. The composition of claim 3 wherein said organic lubricant comprises a synthetic oil lubricant or grease thereof.

25. The composition of claim 3 wherein said organic lubricant comprises a two-mol ethoxylate of isostearyl alcohol.

26. The composition of claim 3 wherein said organic lubricant comprises a soap.

27. The composition of claim 3 wherein said organic lubricant comprises a polymerized olefin.

28. The composition of claim 3 wherein said organic lubricant comprises an organic ester.

* * * * *